United States Patent
Chindapol et al.

(10) Patent No.: US 8,310,961 B2
(45) Date of Patent: Nov. 13, 2012

(54) TECHNIQUES FOR LINK UTILIZATION FOR HALF-DUPLEX AND FULL-DUPLEX STATIONS IN A WIRELESS NETWORK

(75) Inventors: Aik Chindapol, Washington, DC (US); Zexian Li, Espoo (FI); Roberto Albanese, Helsinki (FI); Andrea Bacioccola, Helsinki (FI); Shashikant Maheshwari, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 329 days.

(21) Appl. No.: 12/049,265

(22) Filed: Mar. 14, 2008

(65) Prior Publication Data

US 2009/0092066 A1 Apr. 9, 2009

Related U.S. Application Data

(60) Provisional application No. 60/978,405, filed on Oct. 8, 2007, provisional application No. 60/978,406, filed on Oct. 9, 2007.

(51) Int. Cl.
H04L 12/50 (2006.01)
H04Q 11/00 (2006.01)
(52) U.S. Cl. ...................................... 370/277
(58) Field of Classification Search .................. 370/277, 370/336, 329, 281, 276, 297
See application file for complete search history.

(56) References Cited

U.S. PATENT DOCUMENTS

| | | | |
|---|---|---|---|
| 6,272,117 B1 * | 8/2001 | Choi et al. ................ 370/330 | |
| 6,711,416 B1 | 3/2004 | Zhang | |
| 6,990,090 B2 | 1/2006 | Meier | |
| 7,113,495 B2 | 9/2006 | Furukawa | |
| 7,646,752 B1 | 1/2010 | Periyalwar et al. | |
| 2002/0018448 A1 | 2/2002 | Amis et al. | |
| 2002/0080736 A1 | 6/2002 | Furukawa | |
| 2002/0102948 A1* | 8/2002 | Stanwood et al. ............ 455/91 |
| 2002/0191573 A1 | 12/2002 | Whitehill et al. | |

(Continued)

FOREIGN PATENT DOCUMENTS

DE 10053809 A1 5/2002

(Continued)

OTHER PUBLICATIONS

D. Schultz et al, IST-2003-507581 Winner- Proposal of the best suited deployment concepts for the identified scenarios and related RAN Protocols, D3.5 version 1.0, 05.01.2006, Information society Technologies, pp. 93-94.*

(Continued)

*Primary Examiner* — Mark Rinehart
*Assistant Examiner* — Maharishi Khirodhar
(74) *Attorney, Agent, or Firm* — Brake Hughes Bellermann LLP

(57) ABSTRACT

Various example embodiments are disclosed herein. According to an example embodiment, an apparatus may include a controller, and a wireless transmitter coupled to the controller, the wireless transmitter configured to the wireless transmitter configured to transmit at least a portion of a frame via wireless link to one or more mobile stations in a wireless network, the at least a portion of a frame including: an all-group downlink region directed to group 1 half-duplex (HD) mobile stations, group 2 HD mobile stations, and full-duplex (FD) mobile stations, a group 1 downlink region directed to the group 1 HD mobile stations and the FD mobile stations, and a group 2 downlink region directed to the group 2 HD mobile stations and the FD mobile stations.

30 Claims, 17 Drawing Sheets

U.S. PATENT DOCUMENTS

| | | | |
|---|---|---|---|
| 2003/0091014 A1 | 5/2003 | Meier | |
| 2004/0025018 A1 | 2/2004 | Haas et al. | |
| 2004/0109493 A1 | 6/2004 | Blessent et al. | |
| 2004/0170147 A1 | 9/2004 | Take | |
| 2005/0058151 A1 | 3/2005 | Yeh | |
| 2005/0064818 A1 | 3/2005 | Assarsson et al. | |
| 2005/0117539 A1 | 6/2005 | Song et al. | |
| 2005/0232183 A1 | 10/2005 | Sartori et al. | |
| 2005/0286547 A1 | 12/2005 | Baum et al. | |
| 2006/0029011 A1* | 2/2006 | Etemad et al. | 370/311 |
| 2006/0107166 A1 | 5/2006 | Nanda | |
| 2006/0176973 A1 | 8/2006 | Alamouti et al. | |
| 2007/0076663 A1 | 4/2007 | Qi et al. | |
| 2007/0097945 A1 | 5/2007 | Wang et al. | |
| 2007/0110016 A1 | 5/2007 | Shen et al. | |
| 2007/0121546 A1 | 5/2007 | Zuckerman et al. | |
| 2008/0002610 A1 | 1/2008 | Zheng et al. | |
| 2008/0039014 A1 | 2/2008 | Tsai et al. | |
| 2008/0056193 A1 | 3/2008 | Bourlas et al. | |
| 2008/0069067 A1 | 3/2008 | Sood et al. | |
| 2008/0075184 A1 | 3/2008 | Muharemovic et al. | |
| 2008/0089309 A1 | 4/2008 | Groleau | |
| 2008/0117854 A1 | 5/2008 | Saifullah et al. | |
| 2008/0247375 A1 | 10/2008 | Muharemovic et al. | |
| 2008/0268844 A1 | 10/2008 | Ma et al. | |
| 2008/0291847 A1 | 11/2008 | Zheng | |
| 2009/0092067 A1* | 4/2009 | Sudarshan et al. | 370/281 |
| 2009/0213766 A1 | 8/2009 | Chindapol et al. | |
| 2009/0219841 A1 | 9/2009 | Sudarshan et al. | |
| 2009/0268645 A1 | 10/2009 | Chindapol et al. | |
| 2009/0325578 A1 | 12/2009 | Li et al. | |
| 2010/0008326 A1 | 1/2010 | Albanese et al. | |
| 2010/0177717 A1 | 7/2010 | Sung et al. | |

FOREIGN PATENT DOCUMENTS

| | | |
|---|---|---|
| EP | 1389853 A1 | 2/2004 |
| EP | 1524800 A2 | 4/2005 |
| EP | 1912390 A1 | 4/2008 |
| WO | 99/14897 A2 | 3/1999 |
| WO | 00/55640 A1 | 9/2000 |
| WO | 2006/096728 A2 | 9/2006 |
| WO | 2008/004062 A2 | 1/2008 |
| WO | 2008/004062 A8 | 1/2008 |
| WO | 2008/004066 A2 | 1/2008 |
| WO | 2008/004062 A3 | 4/2008 |
| WO | 2008/047203 A2 | 4/2008 |
| WO | 2008/047203 A3 | 6/2008 |
| WO | 2008/004066 A3 | 7/2008 |
| WO | 2009/047709 A2 | 4/2009 |
| WO | 2009/047709 A3 | 8/2009 |

OTHER PUBLICATIONS

Proposal of the best suited deployment concepts for the identified scenarios and related ran protocols, May 1, 2006, D.Schults et al, entire document.*

Proposal of the best suited deployment concepts for the identified scenarios and related ran protocol. May 1, 2006, D.Schults et al, entire document.*

Support of Full Duplex MS (OFDMA FDD) in draft IEEE 802.16Rev2/D4, Dan Gal, Alcatel-Lucent, slide 3-5, Copyright 2004.*

Final Office Action for U.S. Appl. No. 11/549,387, mailed on Aug. 5, 2010, 7 pages.

Non-Final Office Action for U.S. Appl. No. 11/871,649, mailed on Oct. 19, 2010, 24 pages.

Non-Final Office Action for U.S. Appl. No. 11/480,767, mailed on Aug. 18, 2010, 18 pages.

Final Office Action for U.S. Appl. No. 12/035,262, mailed on Dec. 10, 2010, 24 pages.

Office Action for Israel Patent Application Serial No. 195928 (with English Translation), mailed on Feb. 24, 2010, 2 pages.

Office Action for Russian Patent Application No. 2009117689 (with English Translation), mailed on Aug. 13, 2010, 5 pages.

"Part 16: Air Interface for Broadband Wireless Access Systems", Draft Standard for Local and metropolitan area networks,IEEE WirelessMAN 802.16, LAN/MAN Standards Committee of the IEEE Computer Society, IEEE Microwave Theory and Techniques Society, P802.16Rev2/D5, Jun. 2008, pp. 704-726, 825-835 and 887-934.

Part 16: Air Interface for Fixed and Mobile Broadband Wireless Access Systems, Multihop Relay Specification, Baseline Document for Draft Standard for Local and Metropolitan Area Networks, Prepared by the Relay Task Group of IEEE 802.16, 802.16j-06/026r4, Jun. 6, 2007, 203 pages.

"6.32.3.5 Ranging Request (RNG-REQ) message", IEEE, Air Interface for Fixed Broadband Wireless Access Systems, IEEE Std 802.16/2004, 2004, p. 49.

"DL/UL Offset FDD/H-FDD Frame Structure for Release 1.x: Harmonized Proposal", WiMAX Forum on Alcatel-Lucent, Oct. 2, 2007, pp. 1-9.

Search Report and Written Opinion received for International Application Serial No. PCT/IB2008/054113, mailed on Jun. 19, 2009, pp. 16.

"R1.x FDD/Full Duplex-Current status and open issues", WiMAX Forum, Mar. 12, 2008, 15 pages.

"R1.x FDD/HFDD Ad Hoc Mar. 2008 Recommendation to TWG", WiMAX Forum, Mar. 14, 2008, 5 pages.

"WiMAX FDD Proposal for REL 1.x", WiMAX Forum, Motorola, 2004, 6 pages.

Zheng, Haihong et al., "Transmission Scheme of MAC Management Message towards a RS Group in multi-hop relay System", IEEE 802.16 Broadband Wireless Access Working Group, Jan. 8, 2007, 9 pages.

Yagahoobi, Hassan, "R1.5 FDD/HFDD Ad Hoc Apr. 2008 Opening Report", WiMAX Forum, Intel Corporation, Apr. 28, 2008, 5 pages.

Zheng, Haihong et al., "Harq with Relays", IEEE 802.16 Presentation Submission Template (Rev. 8.3), Nov. 7, 2006, 12 pages.

Axnas, J. et al., "Final report on identified RI key technologies system concept and their assessment", WINNER, D2.10 version 1.0, Dec. 23, 2005, pp. 1-2, 38-39 and 83-96.

Bacioccola, Andrea et al., "R1.x FDD/Full Duplex—Current status and open issues", WiMAX Forum, Nokia, Mar. 15, 2008, 15 pages.

Bacioccola, Andrea et al., "R1.x FDD/Full Duplex-Current Status and Open Issues", WiMAX Forum, Nokia and NSN, Apr. 15, 2008, 8 pages.

Bacioccola, Andrea et al., "R1.x FDD/Full Duplex-Current Status", WiMAX Forum, Nokia, NSN and Huawei, Apr. 15, 2008, 13 pages.

Campbell, Andrew T., et al., "Spawning Networks", IEEE Network, IEEE Inc. New York, US, Jul./Aug. 1999, pp. 16-29.

Chion, Mary et al., "Fix for Problems in UL Allocation", IEEE 802.16 Broadband Wireless Access Working Group, Jun. 12, 2005, pp. 1-4.

European Search Report received from EP Application No. EP 02018385, mailed on Jan. 29, 2003, 3 pages.

Gal, Dan et al., "Support of Full Duplex MS (OFDMA FDD) in draft IEEE 802.16Rev2/D4", WiMAX Forum, Alcatel-Lucent, Apr. 7, 2008, pp. 1-6.

"Part 16: Air Interface for Fixed Broadband Wireless Access Systems", IEEE Standard 802.16 (Revision of IEEE Std 802.16/2001), IEEE Standards for Local and Metropolitan area networks, Oct. 1, 2004, 894 pages.

Johnson, David. B. et al., "Dynamic Source Routing in Ad Hoc Wireless Networks", Carnegie Mellon University, 1995, pp. 1-18.

Kim, Kyung-Ah et al., "A Seamless Handover Mechanism for IEEE 802.16e Broadband Wireless Access", School of Electrical Engineering and Computer Science, Seoul National University, Seoul, Republic of Korea, Feb. 28, 2005, pp. 1-8.

Marks, Roger, "IEEE Standard 802.16: A Technical Overview of the WirelessMAN Air Interface for Broadband Wireless Access", IEEE 802.16 Broadband Wireless Access Working Group, Jun. 4, 2002, 12 pages.

McBeath, Sean et al., "DCD/UCD Consideration for FDD", WiMAX Forum, Huawei, 2006, 5 pages.

McBeath, Sean et al., "Serving F-FDD Mobile Stations v2", WiMAX Forum, Huawei, 2006, 5 pages.

Otyakmaz, Arif et al., "Parallel operation of half- and full-duplex FDD in future multi-hop mobile radio networks", Jun. 22, 2008, pp. 1-7.

Pabst, Ralf, "Realy-Based Deployment Concepts for Wireless and Mobile Broadband Radio", IEEE Communications Magazine, Wireless World Research Forum, Sep. 2004, pp. 80-89.

Saifullah, Yousuf et al., "Clarification on CDMA Codes TLV", IEEE 802.16 Broadband Wireless Access Working Group, Jul. 13, 2007, pp. 1-3.

Saifullah, Yousuf et al., "Resource Request for Bandwidth", IEEE 802.16 Presentation Submission Template (Rev 8.3), Nov. 15, 2006, 8 pages.

Saifullah, Yousuf et al., "Resource Request for Bandwidth", IEEE 802.16 Broadband Wireless Access Working Group, Jan. 18, 2007, pp. 1-9.

Jang, H., et al, "Mobile IPv6 Fast Handovers Over IEEE 802.16e Networks", MIPSHOP Working Group, Internet Draft, Nov. 16, 2007, 18 pages.

Seol, Ji-Yun, "Re11.x FDD/HFDD Flexible UL allocation signaling for F-FDD MS in H-FDD frame structure", WiMAX Forum, Samsung Electronics, Apr. 2008, 9 pages.

Villela, Daniel et al., "Virtuosity: Programmable Resource Management for Spawning Networks", Computer Networks, Elsevier Science Publishers B.V., Amsterdam, NL, vol. 36, No. 1, Jun. 2001, pp. 1-29.

Wiemann, Henning et al., "A Novel Multi-Hop ARQ Concept", Vehicular Technology Conference, IEEE 61st VTC 2005-Spring, Jun. 1, 2005, pp. 3097-3101.

Xu, Allan et al., "R1.x FDD/Full Duplex Additional Option for 2 Map Approach", WiMAX Forum, Huawei, Apr. 28, 2008, 4 pages.

Bacioccola, Andrea et al., "R1.x FDD/Full Duplex—Current status and open issues", WiMAX Forum, Mar. 12, 2008, 15 pages.

"Draft Standard for Local and Metropolitan area Networks, Part 16: Air Interface for Broadband Wireless Access Systems", IEEE Computer Society, Dec. 2007, pp. 114-536 (Section 6.3), 742-1079 (Section 8.4), and 1107-1263 (Section 11).

Final Office Action for U.S. Appl. No. 11/871,649, mailed on Jun. 7, 2011, 17 pages.

Non-Final Office Action Response for U.S. Appl. No. 11/871,649, filed on Mar. 30, 2011, 22 pages.

Non-Final Office Action for U.S. Appl. No. 12/111,958, mailed on Apr. 1, 2011, 29 pages.

Office Action for U.S Appl. No. 12/163,084, mailed on Jun. 9, 2011, 21 pages.

Final Office Action received for U.S. Appl. No. 12/111,958, mailed on Jan. 5, 2012, 21 pages.

Non-Final Office Action Response filed for U.S. Appl. No. 12/111,958, filed on Sep. 1, 2011, 16 pages.

Non Final Office Action received for U.S. Appl. No. 12/163,084, mailed on Oct. 27, 2011, 11 pages.

Non Final Office Action received for U.S. Appl. No. 12/498,634, mailed on Oct. 4, 2011, 34 pages.

* cited by examiner

TECHNIQUES FOR LINK UTILIZATION FOR HALF-DUPLEX AND FULL-DUPLEX STATIONS IN A WIRELESS NETWORK

CROSS-REFERENCE TO RELATED APPLICATION

This application claims priority based on U.S. Provisional Application No. 60/978,405, filed on Oct. 8, 2007, entitled, "FDD Frame Structure for Wireless Networks," the disclosure of which is hereby incorporated by reference, and also based on U.S. Provisional Application No. 60/978,406, filed on Oct. 9, 2007, entitled, "FDD Frame Structure for Wireless Networks," the disclosure of which is hereby incorporated by reference.

TECHNICAL FIELD

This description relates to wireless networks.

BACKGROUND

In wireless networks, different techniques have been proposed to allocate various media resources to users. One example allocation technique includes Frequency Division Duplexing (FDD), where uplink (UL) transmissions (e.g., from a mobile station to a base station) may occur on a first carrier frequency (or frequencies), and downlink (DL) transmissions (e.g., from a base station to a mobile station) may occur on a second carrier frequency (or frequencies). FDD may offer a relatively efficient use of channel resources. Base stations (BSs), Access Points (APs) or other infrastructure nodes may typically be Full Duplex-FDD (FD-FDD), in which the BSs may transmit and receive at the same time (but on different frequencies). However, some types of mobile stations (MSs) or subscriber stations may be Half Duplex-FDD (HD-FDD) devices, which may either transmit or receive at one time (but typically not both), and may alternate between periods of downlink receiving, and uplink transmission (on different frequencies). Mobile stations in a wireless network may also be Full Duplex-FDD (FD-FDD), in which the MSs may transmit and receive at the same time, but on different channels or frequencies. Problems may arise when attempting to serve both half-duplex (HD) and full-duplex (FD) mobile stations.

SUMMARY

According to an example embodiment, a method may include transmitting at least a portion of a frame to one or more mobile stations in a wireless network, the at least a portion of the frame including: an all-group downlink region directed to group 1 half-duplex (HD) mobile stations, group 2 HD mobile stations, and full-duplex (FD) mobile stations, a group 1 downlink region directed to the group 1 HD mobile stations and the FD mobile stations, and a group 2 downlink region directed to the group 2 HD mobile stations and the FD mobile stations.

According to an example embodiment, an apparatus may include a controller, and a wireless transmitter coupled to the controller, the wireless transmitter configured to transmit at least a portion of a frame via wireless link to one or more mobile stations in a wireless network, the at least a portion of a frame including: an all-group downlink region directed to group 1 half-duplex (HD) mobile stations, group 2 HD mobile stations, and full-duplex (FD) mobile stations, a group 1 downlink region directed to the group 1 HD mobile stations and the FD mobile stations, and a group 2 downlink region directed to the group 2 HD mobile stations and the FD mobile stations.

According to another example embodiment, a method may include receiving, at a mobile station via a wireless link, at least a portion of a first frame, the at least a portion of the first frame including an all-group downlink region, the all-group downlink region including one or more broadcast management messages, the at least a portion of the first frame further including a broadcast control message that indicates at least the following for one or more of the management messages: a management message type, a frame number or other identifier of a second frame that includes a next transmission of the management message. The method may also include making a determination that the mobile station will transmit data via an uplink region of the second frame rather than receiving the next transmission of the management message in an all-group downlink region of the second frame, and transmitting, based on the determination, data via the uplink region of the second frame instead of receiving the next transmission management message in the all-group downlink region of the second frame, at least a portion of the uplink region of the second frame overlapping in time with at least a portion of the all-group downlink region of the second frame.

According to another example embodiment, an apparatus may include a receiver at a mobile station, the receiver configured to receive via a wireless link, at least a portion of a first frame, the at least a portion of the first frame including an all-group downlink region, the all-group downlink region including one or more broadcast management messages, the at least a portion of the first frame further including a broadcast control message that indicates at least the following for one or more of the management messages: a management message type, a frame number or other identifier of a second frame that includes a next transmission of the management message. The apparatus may also include a controller configured to make a determination that the mobile station will transmit data via an uplink region of the second frame rather than receiving the next transmission of the management message in an all-group downlink region of the second frame, and a transmitter configured to transmit, based on the determination, data via the uplink region of the second frame instead of receiving the management message in the all-group downlink region of the second frame, at least a portion of the uplink region of the second frame overlapping in time with at least a portion of the all-group downlink region of the second frame.

According to yet another example embodiment, a method may include receiving, at a mobile station via a wireless link, at least a portion of a first frame, the at least a portion of the first frame including an all-group downlink region directed to group 1 half-duplex (HD) mobile stations, group 2 HD mobile stations, and full-duplex (FD) mobile stations, the all-group downlink region including a broadcast management message, the at least a portion of the first frame further including a broadcast control message that indicates at least the following for the management message: a management message type, a frame number or other identifier of a second frame that includes a next transmission of the management message, and an indication as to whether such next transmission of the management message will include any changes. The method may also include determining whether the mobile station will receive the next transmission of the management message in an all-group downlink region of the second frame or transmit data via an uplink region of the second frame, at least a portion of the uplink region of the second frame overlapping at least a portion of the all-group downlink region of the second frame, receiving at least a portion of the second frame including the next transmission of the management message if the mobile station determined to receive the next transmission of the management message in the second frame, and transmitting data via the uplink region of the second frame instead of receiving the management message in the all-group downlink region of the second frame if the mobile station determined to transmit data in the uplink region of the second frame.

According to another example embodiment, an apparatus may include a receiver at a mobile station, the receiver configured to receive via a wireless link, at least a portion of a first frame, the at least a portion of the first frame including an all-group downlink region directed to group 1 half-duplex (HD) mobile stations, group 2 HD mobile stations, and full-duplex (FD) mobile stations, the all-group downlink region including a broadcast management message, the at least a portion of the first frame further including a broadcast control message that indicates at least the following for the management message: a management message type, a frame number or other identifier of a second frame that includes a next transmission of the management message, and an indication as to whether such next transmission of the management message will include any changes. The apparatus may also include a controller configured to determine whether the mobile station will receive the next transmission of the management message in an all-group downlink region of the second frame or transmit data via an uplink region of the second frame, at least a portion of the uplink region of the second frame overlapping at least a portion of the all-group downlink region of the second frame, the receiver configured to receive at least a portion of the second frame including the next transmission of the management message if the mobile station determined to receive the next transmission of the management message in the second frame, and a transmitter configured to transmit data via the uplink region of the second frame instead of receiving the management message in the all-group downlink region of the second frame if the mobile station determined to transmit data in the uplink region of the second frame.

The details of one or more implementations are set forth in the accompanying drawings and the description below. Other features will be apparent from the description and drawings, and from the claims.

DETAILED DESCRIPTION

Figure 1:
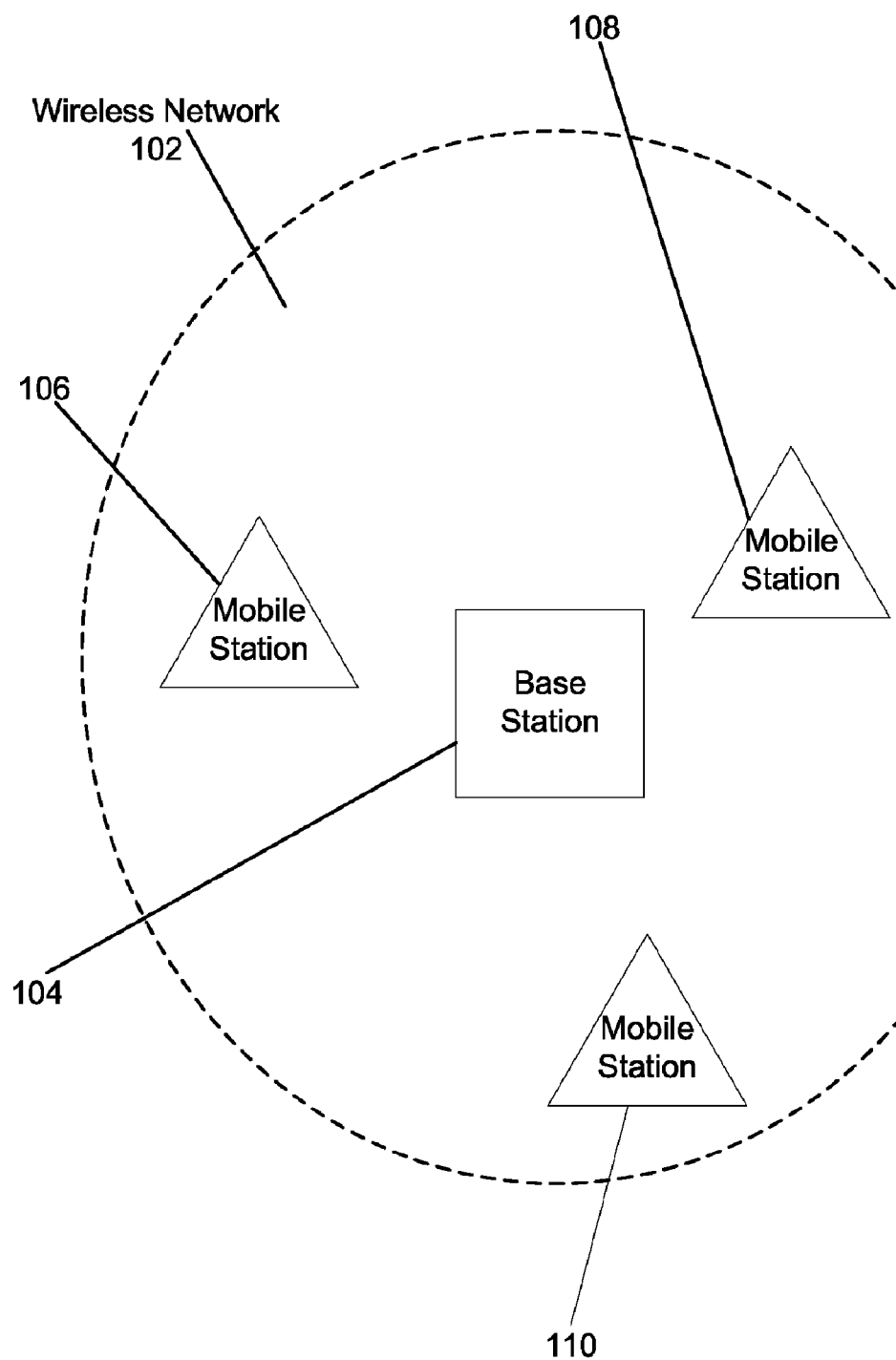
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMax or other wireless standards, aspects of the present disclosure may be applicable to any networking or wireless technologies.

Figure 2:
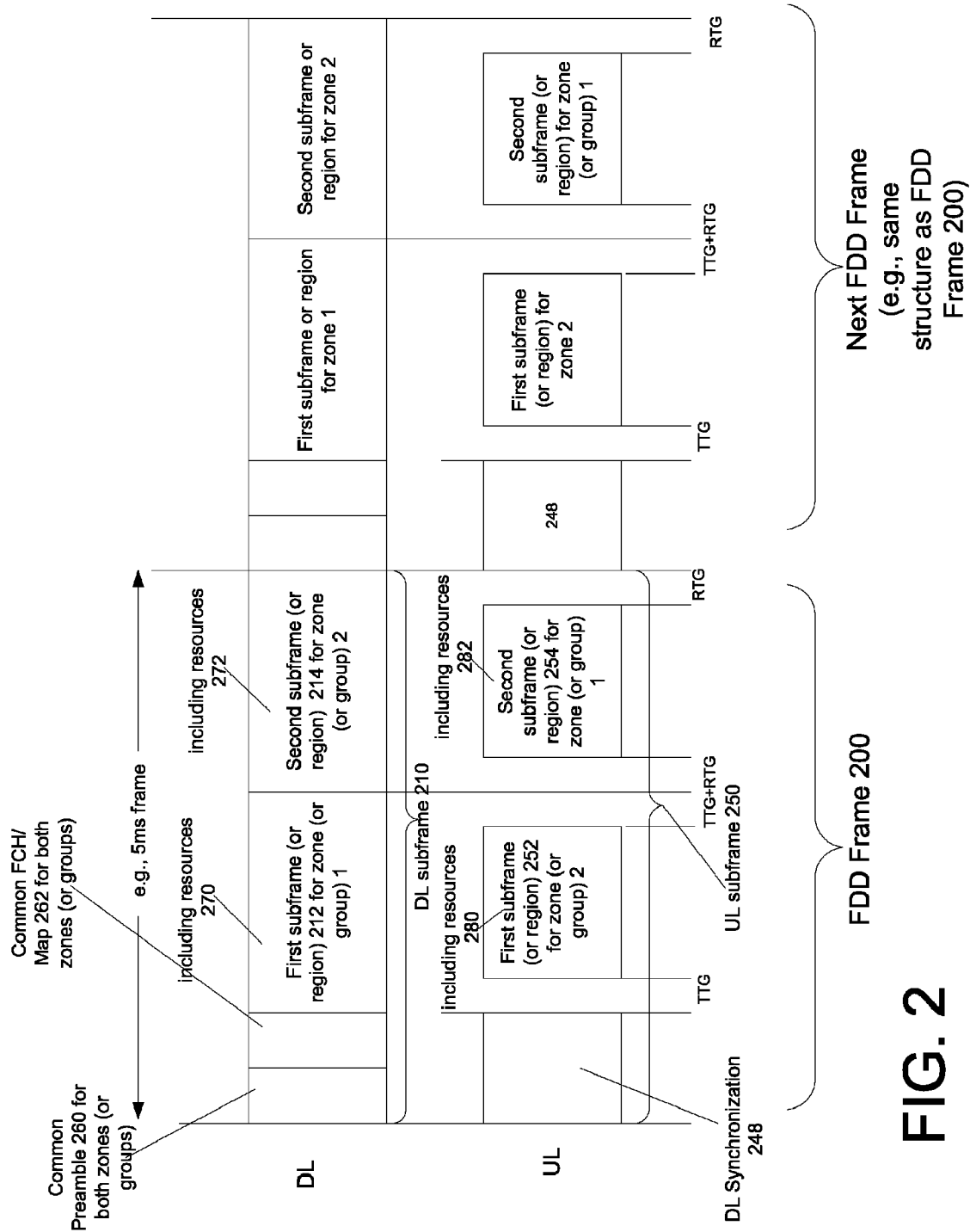
FIG. 2 is a diagram illustrating an example embodiment of a frame that may be used for a Frequency Division Duplexing (FDD) system.

FIG. 2 is a diagram illustrating an example embodiment of a frame that may be used for a Frequency Division Duplexing (FDD) system. Frame 200 may include a DL (downlink) subframe 210 indicating signals transmitted from one or more base stations and received at one or more mobile stations. Frame 200 may include an UL (uplink) subframe 250 indicating signals transmitted from one or more mobile stations and received by a base station. The frame 200 illustrates an example of a half-duplex FDD system in which one or more mobile stations may receive DL signals via a first frequency (e.g., f1), or first set of frequencies, within a DL subframe 210, and may transmit signals UL to a base station via a second frequency (e.g., f2), or second set of frequencies, within an UL subframe 250.

Mobile stations in a wireless network may even be divided up into two groups (for example) to provide a more efficient use of channel resources, so that both the uplink carrier frequency and the downlink carrier frequency may be used at the same time, at least in some cases. For example, during one time period, a first group (or group 1 of HD MSs) of mobile stations may receive in a downlink direction, while a second group (group 2 of HD MSs) of mobile stations is allowed to transmit in an uplink direction to the BS or infrastructure node. Then, during a second time period, the first group may transmit and the second group may receive. Such an arrangement of HD-FDD mobile stations, being divided into two groups and alternating receiving and transmitting, may also have challenges in maintaining synchronization between at least some of the mobile stations and the BS or infrastructure node. One or more mobile stations may also be full duplex (FD)-FDD, where the mobile station may transmit UL and receive DL at the same time (but on different frequencies).

When a FD MS enters into a network, it can join (or become a member of) one or multiple groups at the same time, allowing the FD MS to transmit and receive, at the same time, during one or more, or even all, of the regions of a frame. Also, in an example embodiment, a BS may assign the FD MS to one group right after network entry, e.g., where a FD MS may behave or operate as a HD MS (e.g., to reduce power consumption), and only if needed via a control message exchange (e.g., with BS), the FD MS may receive and transmit simultaneously in all (or multiple) groups (e.g., operating as FD MS). The FD MS may alternate its behavior as HD FDD and FD FDD as needed via a control message exchange with BS.

In an example embodiment, a plurality of mobile stations communicating with a base station may be assigned to one of a plurality of zones or groups (e.g., zone 1, zone 2, zone 3 for a three zone system, or maybe zone 1 and zone 2 for a two zone system). The DL frame 210 may include a common preamble 260, and a common FCH (frame control header) and Maps 262. The preamble and FCH and Maps may be considered common in this example since they are provided for, or directed to all zones or groups (e.g., directed to mobile stations for both zone 1 and zone 2). Thus, both zones (or groups of MSs) may share a common preamble 260 and FCH/Maps 262. The preamble 260 may allow mobile stations to perform synchronization during DL synchronization 248 (rather than HD MSs transmitting in the UL during synchronization 248). The common FCH 262 may indicate a length of a DL (downlink) Map which follows the FCH, and a modulation scheme and/or coding rate used for the Maps, number of subchannels, and/or other information. The common Map 262 may include a DL Map and an UL Map, each including information elements identifying resources for downlink and uplink transmission for one or more mobile stations and may also provide the grouping of mobile station to different zone. It may also include the indication for changing the mobile station from one zone/group to another zone/group.

The DL subframe 210 may also include a first subframe (or region of DL subframe) 212 (e.g., for zone 1 or group 1) and a second subframe (or region of DL subframe) 214 (e.g., for zone 2 or group 2). For example, the first subframe 212 may include resources 270 (e.g., OFDM symbols) for downlink reception of signals for zone 1 mobile stations. Likewise, the second subframe 214 may include resources 272 (e.g., OFDM symbols) to allow zone 2 mobile stations to receive signals from the base station.

The uplink (UL) subframe 250 may allow mobile stations to transmit data via a second frequency (e.g., f2) to a base station. All HD (half-duplex)-FDD stations should not transmit during DL synchronization 248, but rather should receive the common preamble 260 and common FCH and Map, and perform DL synchronization with the base station based on the preamble.

After a switching period (TTG, or BS transmit/receive transition gap), the UL frame 250 may include a first subframe (or region of UL subframe) 252 to allow mobile stations of zone (or group) 2 to transmit to the base station, and a second subframe (or region of UL subframe) 254 to allow mobile stations of zone (or group) 1 to transmit to the base station. First subframe 252 may include resources 280, and second subframe 254 may include resources 282.

Thus, mobile stations of both zone 1 (group 1) and zone 2 (or group 2) may receive a common preamble 260 and a common Map/FCH 262, and perform DL synchronization 248. Each of the mobile stations may determine a zone or a plurality of zones that the mobile station is assigned to based on the common map. For example, the common map may include a mask, bit map, or other DL control information indicating a zone (or group) assignment or change in zone (or group) assignment for each of the plurality of mobile stations. For example, the Map may indicate that a mobile station is now assigned to zone (or group) 2, or the mobile station may have been assigned to zone (or group) 2 based on a Map in a previous FDD frame, as examples. The Map may also include Map IEs (information elements) that allocate resources for uplink and/or downlink transmissions for one or more mobile stations.

Thus, after receiving the common preamble and FCH/Map, mobile stations of zone (or group) 1 may receive signals via first subframe 212 (of DL subframe 210), and then transmit signals to base station via second subframe 254 (of UL subframe 254). Likewise, mobile stations of zone (or group) 2 may transmit signals to the base station via first subframe (or region) 252 (of UL subframe 250) and may receive signals from the base station via subframe (or region) 214 (of UL subframe 210).

In an example embodiment, 100 mobile stations (MSs) may be registered with or in communication with a base station. MSs 1-50 may be assigned to zone (or group) 1, and MSs 51-100 may be assigned to zone (or group) 2. The common Map may indicate which zone (or group) each or at least some of the MSs are assigned to, or may indicate reassignments or deallocation of one or more MSs. According to an example embodiment, a first group of IEs in the common Map may allocate resources for zone (or group) 1 MSs, while a second group of IEs in the common Map may allocate resources for the zone (or group) 2 MSs.

In an example embodiment, a FDD frame 200 may include a plurality of resources, such as a group (e.g., 48) OFDM symbols. For example, 8 OFDM symbols may be provided for common preamble 260/Map and FCH 262, 18 OFDM symbols for subframe 212, and 22 OFDM symbols provide for subframe 214. This is merely an example embodiment. In order to have more OFDM symbols available in DL frame, no GAPs are introduced in DL frame, instead, all the gaps are provided in UL frame by giving time for MSs of different zone (or group) to switch from DL to UL and UL to DL transmission. This is merely an example embodiment. The GAPs can be placed flexibly according to different deployment scenarios.

Figure 3:
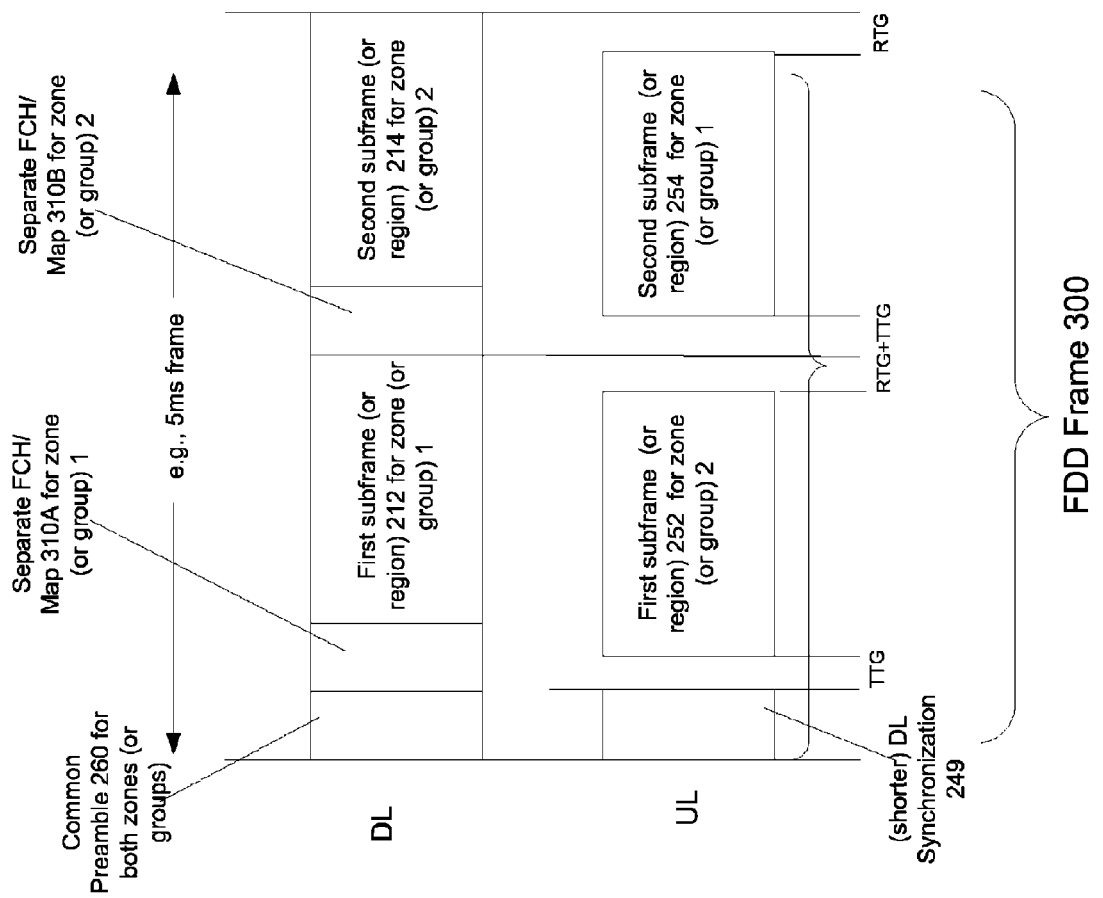
FIG. 3 is a diagram illustrating another example embodiment of a frame that may be used for a Frequency Division Duplexing (FDD) system.

FIG. 3 is a diagram illustrating another example embodiment of a frame that may be used for a Frequency Division Duplexing (FDD) system. The frame 300 illustrated in FIG. 3 is similar to that shown in FIG. 2. The frame 300 in FIG. 3 includes a common preamble 260 for all (or both) zones (or groups) 1 and 2. However, instead of providing a common Map and FCH (as in FIG. 2), the frame 300 in FIG. 3 includes a separate zone (or group)—specific FCH and Map. For example, a first FCH/Map 310A for zone (or group) 1 may be provided after common preamble 260, and, e.g., provided either before or within first subframe 212 that provides DL resources for zone (or group) 1. Similarly, a second zone (or group)—specific FCH and Map 310B may be provided, e.g., either before or within second subframe 214 that provides DL resources for zone (or group) 2 mobile stations. It is possible to have more than two zones (or groups) with a separate zone (or group)—specific FCH and MAP or each zone. Since the FCH/Map has been moved from a common region or distributed to a sub-frame specific to each individual zone (or group), the DL synchronization period 249 (may also be called UL transmission gaps for HD-FDD MSs) may be shorter for frame 300, as compared to period 248 in Frame 200 of FIG. 2. In one example embodiment, in order to have more OFDM symbols available in DL frame, no gaps may be used in DL frame, instead, all the gaps may be provided in UL frame. In another example embodiment, in order to have more OFDM symbols available in UL frame, no gaps may be used in between groups in UL frame, instead, DL frame may contain gaps. These gaps may be used by MSs of different zones (or groups) to switch from DL to UL and UL to DL transmission. The gaps, which may be, for example, an integer multiple of the symbol duration to ease implementation burden or non-integer number of symbols, can be placed flexibly in either the uplink or the downlink or both according to different deployment scenarios.

In another example embodiment, in addition to supporting HD-FDD MSs, the FD-FDD MSs can operate as a HD-FDD MS that only transmits and receives by associating itself with only one specific group or as a MS that transmits and receives by associating itself with both groups. In addition, the FD-FDD MSs may transmit over (or during) the DL synchronization period 249 and the UL gaps (e.g., TTG gap, RTG+TTG gap, RTG gap) whereas, a HD-FDD MS may typically be unable to transmit during this DL synchronization period 249 and gaps (TTG, RTG+TTG, and RTG) due to its half-duplex capability (e.g., HD MS may either receive or transmit at a time, but not both, for example). The allocation of FD-FDD UL allocation may be done separately regardless of how many available uplink sub-frames. Furthermore, the allocation of FD-FDD UL may be done contiguously across one or more groups and any UL gaps when a gap is an integer multiple of symbol. If a gap is not an integer multiple of symbols, the allocation of FD-FDD UL may be done contiguously across one or more groups using only an integer multiple of symbols or zero part of the gap.

In another example embodiment, the BS may allocate both HD-FDD MSs and FD-FDD MSs over an uplink sub-frame for any group (e.g., first sub-frame 252 and second sub-frame 254). The BS may additionally allocate the FD-FDD MSs over an UL gap e.g., DL synchronization period 249, TTG gap, RTG+TTG gap, RTG gap). In an example embodiment, the BS may coordinate the UL allocations of FD-FDD MSs in a contiguous manner or provide an indication that the allocation in the future uplink sub-frame is continuing from the current allocation. The continuing allocation may be signaled by control information pertained to one or more groups (or zones).

When a FD MS enters into a network, it can join (or become a member of) one or multiple groups at the same time, allowing the FD MS to transmit and receive, at the same time, during one or more, or even all, of the regions of a frame. Also, in an example embodiment, a BS may assign the FD MS to one group right after network entry, e.g., where a FD MS may behave or operate as a HD MS (e.g., to reduce power consumption), and only if needed via a control message exchange, the FD MS may receive and transmit simultaneously in all (or multiple) groups (e.g., operating as FD MS). The FD MS may alternate its behavior as HD FDD and FD FDD as needed via a control message exchange.

Figure 4:
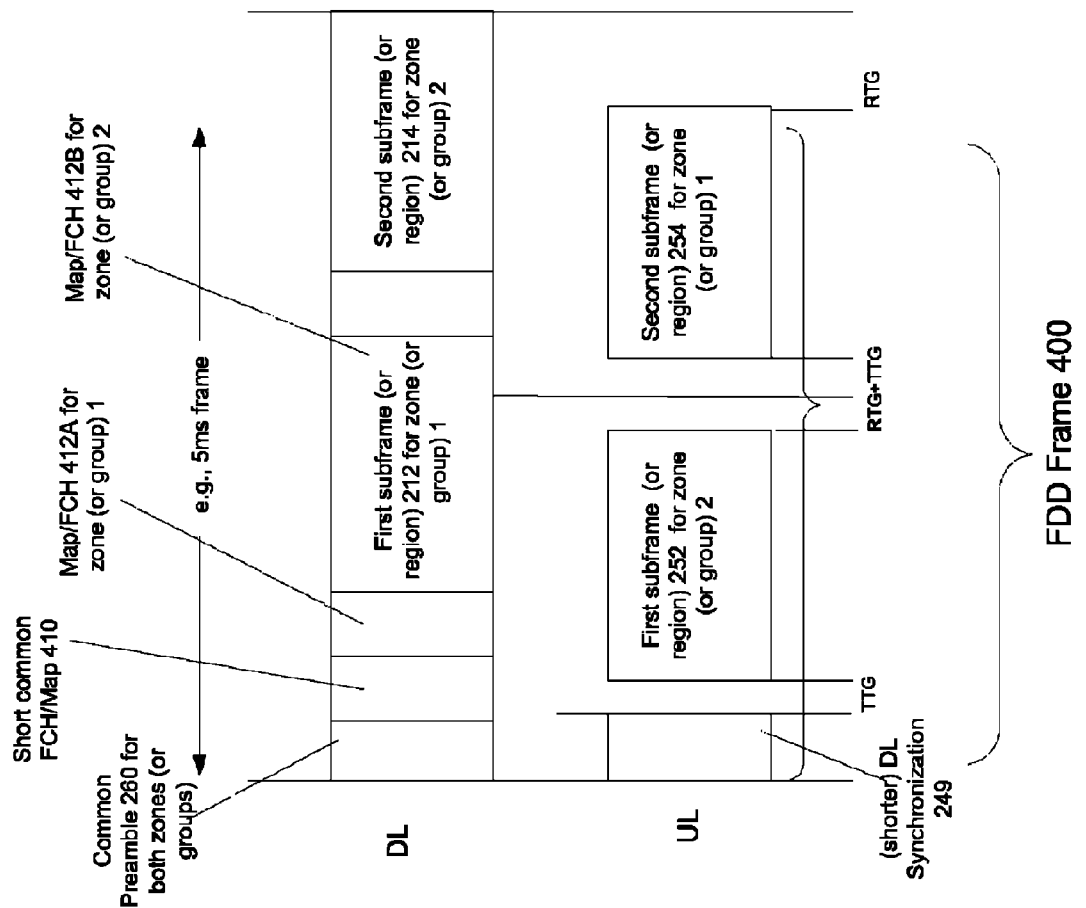
FIG. 4 is a diagram illustrating another example embodiment of a frame that may be used for a Frequency Division Duplexing (FDD) system.

FIG. 4 is a diagram illustrating another example embodiment of a frame that may be used for a Frequency Division Duplexing (FDD) system. In frame 400 shown in FIG. 4. Frame 400 may include a short common FCH/Map 410, which may indicate some common information for all zone (or group) MSs, such as, for example, zone assignment or zone (or group) reassignment or de-allocation for one or more MSs, identification of resources for a ranging region or ranging regions for zone (or group) 1 and zone (or group) 2 (could be a common ranging region of resources, or a first ranging region for zone (or group) 1 in first subframe, and a second ranging region for zone (or group) 2 in a second subframe), may also include information about feedback region for measurements and HARQ ACK feedback region. In addition, short common MAPs may also include the pointers for zone (or group) specific MAPs. The frame 400 may also include a zone (or group) specific Map/FCH for each zone (or group), which may allocate resources for each zone (or group), or for each of the MSs of the associated zone (or group). For example, a first zone -specific Map/FCH 412A for zone (or group) 1, and a second zone(or group) -specific Map/FCH 412B for zone (or group) 2. For example, during network entry, or when a MS enters a network, the MS may receive the common Map/FCH to obtain ranging region or resources for initial ranging. After initial ranging, the base station may typically assign the MS to a zone (or group).

Figure 5:
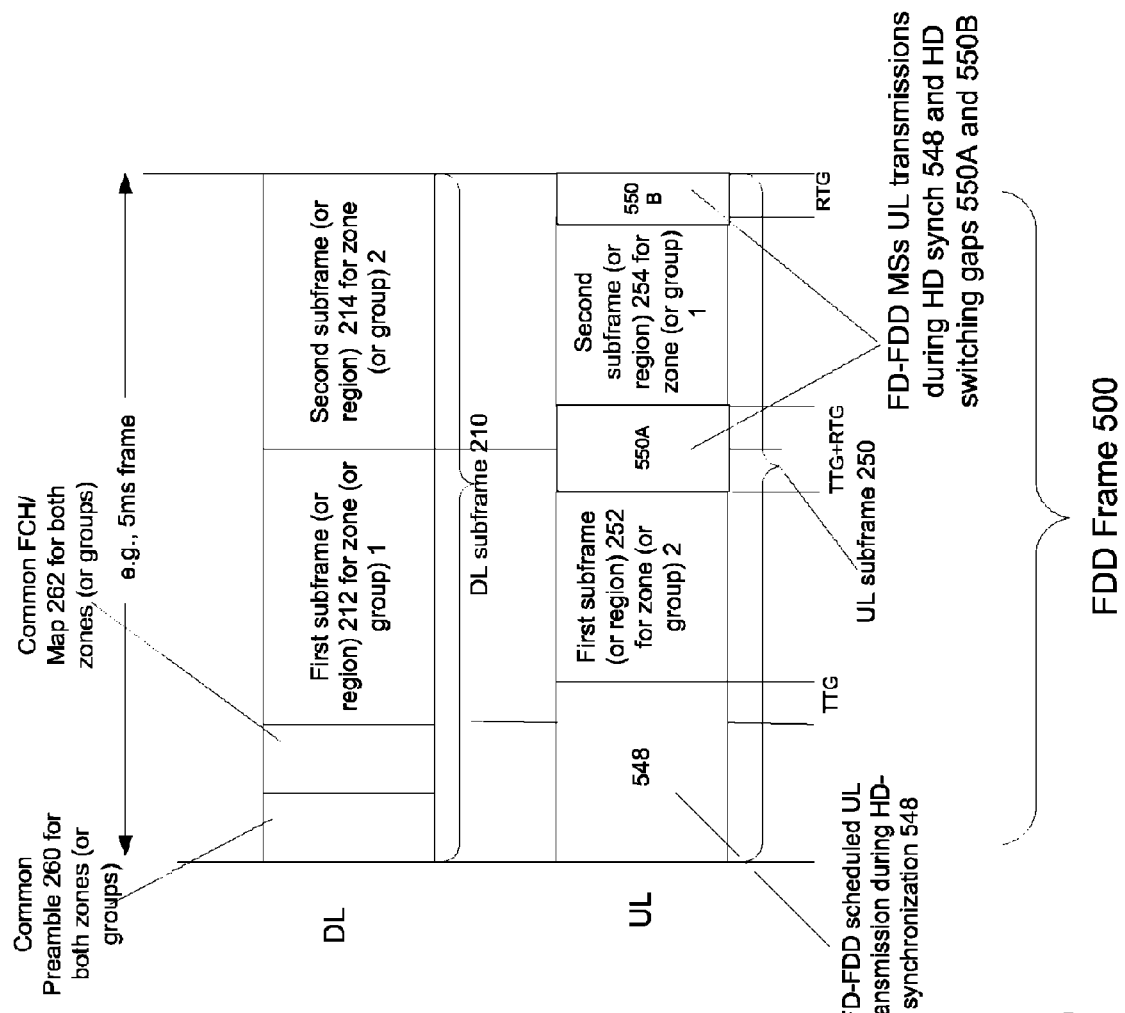
FIG. 5 is a diagram illustrating an example embodiment of a frame that may be used for a Full Duplex Frequency Division Duplexing (FD-FDD) system.

FIG. 5 is a diagram illustrating an example embodiment of a frame that may be used for a Full Duplex Frequency Division Duplexing (FD-FDD) system. Frame 500 (FIG. 5) may include a DL frame 210 that may be similar to that DL frame 210 shown in FIG. 2. AS shown in FIG. 5, a full duplex MS may transmit UL to BS via f1 (or a first frequency or first set of frequencies) and receive DL via f2 (or a second frequency or second set of frequencies) at the same time. The FD-FDD MS may, for example, transmit UL during the half duplex (HD) synchronization period 548. FD-FDD MS may also transmit UL to BS during HD switching gaps 550A (TTG+RTG) and 550B (RTG), for example. This is because, as a full duplex system, the MS does not need to switch its wireless transceiver from transmitting/receiving, and from f1/f2, but can transmit and receive at the same time (on different frequencies).

Thus, in an example embodiment, FDD frame structures are provided that may accommodate both HD-FDD and FD-FDD MSs:

Common Preamble on the DL carrier frequency at the start of the Frame for all MSs (both FD-FDD and HD-FDD MSs)

Divide the DL frame into 2 or more sub-frames (or regions) and allocation of MSs to these sub-frames (or regions) is an implementation issue, e.g., it may be adjusted based on load conditions, channel conditions, etc. There are multiple options for FCH/MAPs locations, such as (for example):

Common FCH and MAPs for all the MSs which may immediately follow the common preamble. Therefore, in an example embodiment, HD-FDD MSs should not transmit in the UL but instead listening to FCH/MAPs. It introduces GAP in the UL (see option 1, FIG. 2). FD-FDD MSs can utilize this GAP in the UL (see option 4, FIG. 5).

Separate FCH and MAPs for two different zones (or groups). (option 2, FIG. 3).

Common FCH and short common MAP. Common MAP points to Zone (or group) specific private MAPs.(option 3, FIG. 4)

Sub-frame 1 will have common preamble, MAPs (based on which option is used from above), DL data for Zone 1 MSs and UL data for Zone 2 MSs.

Sub-frame 2 will have optional MAPs (based on which option is used from above), DL data for Zone 2 MSs and UL data for Zone 1 MSs.

TTG and RTG gaps are shown in the example figures.

Efficiently support HD-FDD and optionally FD-FDD MSs. BS can schedule FD-FDD MSs, such that DL transmission from BS to MS can be performed in DL FDD zone (or group) 1 and UL transmission from same MSs can be performed in UL FDD zone (or group) 2 and Vice versa for other zone (or group).

Load balancing can be done by the BS assigning users to different FDD zones (or groups). An entry in MAP, for example, can be used for this purpose.

5 ms is used as an example frame size, but any frame size may be used

Example advantages (these are merely some possible advantages, depending on the example implementations, and the disclosure is not limited thereto):

compatible to the current WiMAX TDD frame structure; therefore, minimum changes to SW and HW are required.

DL Carrier frequency may be more fully utilized for data transmission. There are typically fewer transmission gaps or unnecessary overhead and thus the DL throughput is maximized Having common preamble provides low overhead without additional overhead The proposed scheme transmits a minimal (or at least a lower) amount of preambles. Preambles may be transmitted at much higher power, for example, than data and induce higher interference at the receiver.

Efficiently support HD-FDD and FD-FDD MSs. BS can schedule FD-FDD MSs such that DL transmission from BS to MS can also be performed in DL FDD zone (or group) 1 and UL transmission from same MSs can be performed in UL FDD zone (or group) 2 and Vice versa. This may allow flexibility at the scheduler in terms of load balancing, QoS support and time-frequency allocations.

According to another example embodiment, wireless network 102 (FIG. 1), may include both half-duplex (HD) and full-duplex (FD) mobile stations. Frame structures may be used to allow a base station serve or accommodate both HD and FD mobile stations.

As described above with reference to FIGS. 1-5, HD mobile stations may be divided into multiple groups, such as group 1 and group 2. In an example embodiment, group 1 HD mobile stations may transmit uplink during a first period of time while group 2 HD mobile stations may receive downlink; and during a second period of time, the roles may be reversed, where group 1 may receive in a downlink direction and group 2 may transmit in an uplink direction. In this manner, dividing HD mobile stations into multiple groups (e.g., group 1 and group 2), which may (at least in some cases) transmit and receive during different periods of time, may allow both uplink and downlink channel resources in a wireless network to be used at the same time, even though each HD mobile station may only transmit or receive at one time. This may allow a more efficient use of channel resources, such as for a frequency division duplex (FDD) system.

In addition, the wireless network 102 may include, or may be capable of accommodating one or more FD mobile stations. FD mobile stations may, for example, transmit uplink via a first frequency or first set of frequencies, and at the same time, may receive downlink via a second frequency or second set of frequencies, where the first and second frequencies are different.

In FIGS. 6-13, frames of different formats are shown that may include different regions (or zones) allocated for different groups. In an example embodiment, group 1 regions in a frame are directed to (e.g., intended for or addressed to) HD mobile stations belonging to group 1 (group 1 HD mobile stations) and to all FD mobile stations. Group 2 regions in a frame are directed to group 2 mobile stations and all FD mobile stations. FD-only regions are directed only to FD mobile stations. All-group regions are directed to all HD mobile stations (e.g., including group 1 and group 2) and all FD mobile stations. In an example embodiment, each HD MS may (or is entitled to) receive/transmit in those regions corresponding to its group or the all-group regions. FD mobile stations may receive/transmit in all regions, according to an example embodiment. In an example embodiment, HD mobile stations may not (typically) process (e.g., transmit or receive) the FD-only regions. These are merely some examples, and the disclosure is not limited thereto.

Some of the example frames described herein may illustrate overlapping allocations, such as a time interval in the frame where a DL all-group region occurs at the same time as (e.g., at least partially overlaps) an UL region (either a group UL region or all-group UL region). According to an example embodiment, a HD MS may (at least in some cases) either receive data via the all-group DL region or may transmit UL via the overlapping UL region. Thus, a HD MS may, at its discretion or by a direct instruction from the BS, make use of either a DL subframe or an UL subframe during this overlapping region. This may provide improved flexibility and may allow a more efficient use of resources and may allow a BS to better serve both FD and HD mobile stations, for example. A number of examples are described below.

Figure 6:
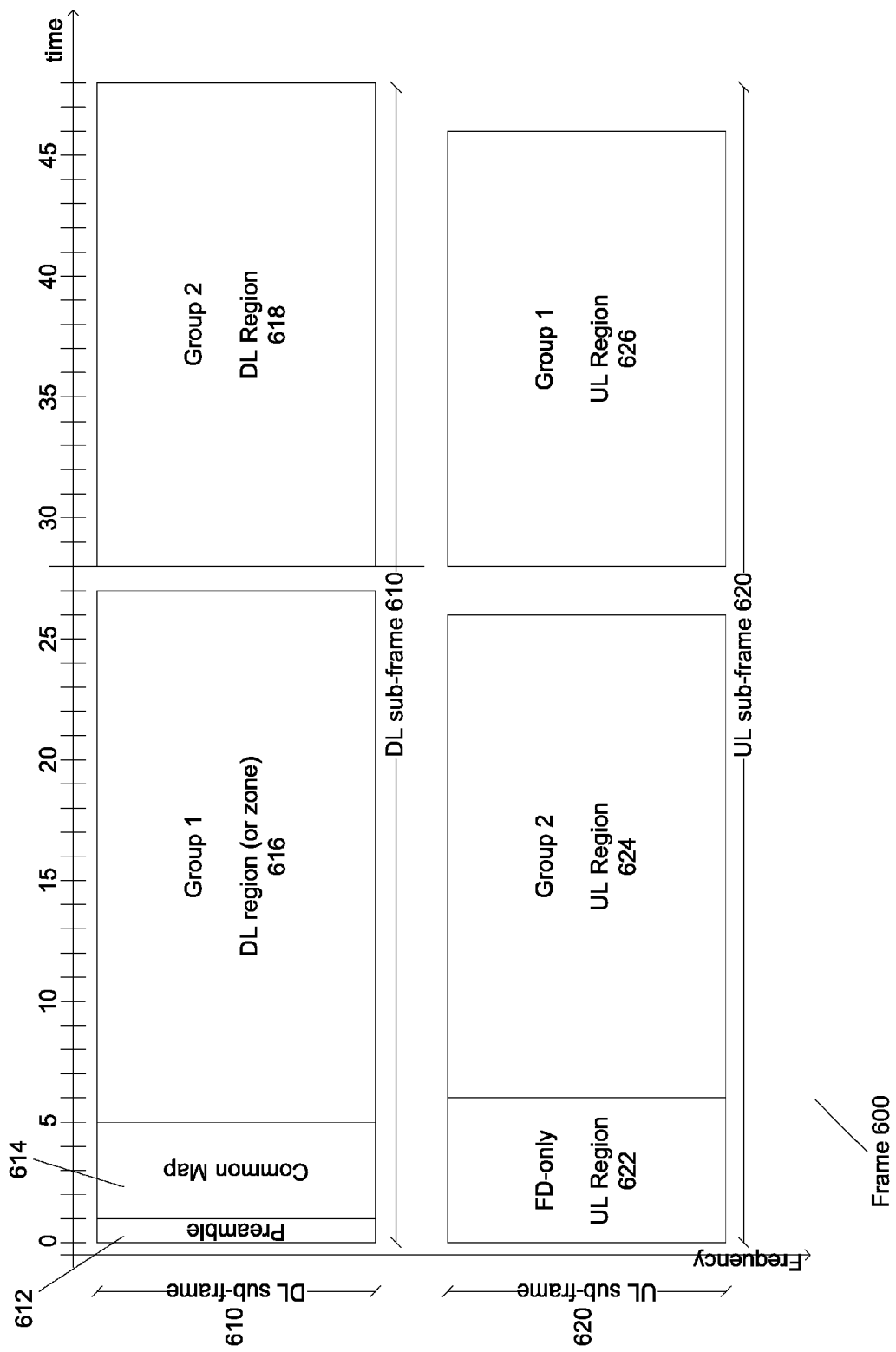
FIG. 6 is a diagram illustrating a frame structure according to an example embodiment.

FIG. 6 is a diagram illustrating a frame structure according to an example embodiment. The frame structure may be used, for example, during normal operations (e.g., when no management frames other than MAP message(s) are broadcasted from the BS). The frame 600 may accommodate both HD and FD FDD mobile stations. Frame 600 may include a downlink (DL) subframe 610 and an uplink (UL) subframe 620. As shown in FIG. 6, DL subframe 610 may be provided on a first set of frequencies, while UL subframe 620 may be provided or transmitted on a second set of frequencies that are different. The DL subframe 610 overlaps in time with UL subframe 620, in a FDD (frequency division duplex) operation. As shown in FIG. 6, frequency is shown on the vertical axis, and time is shown on the horizontal axis.

Referring to FIG. 6, DL subframe 610 may include a preamble 612, a common map 614, a group 1 DL region 616 and a group 2 DL region 618, all transmitted (typically by a base station) in the downlink direction (from BS to MS) and using one or more downlink channel resources (e.g., one or more time slots, subcarriers, OFDM symbols or other resources). The common Map 614 may include, for example, a pointer to or location information identifying the location of group 2 DL region 618. Common map 614, may, for example, also include a DL Map and an UL Map for both group 1 and group 2. Or, in another example embodiment, common map 614 may identify locations (or include pointers to, or a symbol offset identifying a location) of the maps for group 1 and group 2, and location or details of the other regions in frame 600. For example, the maps (DL map and UL map) for group 1 may be included at the beginning of group 1 DL region 616, while the maps for group 2 may be included at the beginning for group 2 DL region 618.

According to an example embodiment, group 1 DL region 616 may be directed to, and may be typically received and decoded by, group 1 HD mobile stations and FD mobile stations within the network. Likewise, group 2 DL region 618 may be directed to, and may be typically received and decoded by, group 2 HD mobile stations and FD mobile stations within the network. FD mobile station may receive group 1 and group 2 data or DL regions because, for example, the FD mobile stations can transmit and receive at the same time.

The UL subframe 620 may include a FD-only UL region 622 in which only full duplex (FD) mobile stations may transmit in uplink to the base station. All mobile stations (group 1, group 2 and FD) may typically receive and decode the preamble 612 and common map 614 (of DL subframe 610). Therefore, typically the HD mobile stations (group 1, group 2 ) are unable to transmit UL during the FD-only UL region 622, since FD-only UL region 622 overlaps with preamble 612 and common map 614, for example. UL subframe 620 may also include a group 2 UL region 624 (which may, for example, at least partially overlap with group 1 DL region 616) to allow group 2 HD mobile stations and/or FD mobile stations to transmit UL to base station 104, and a group 1 UL region 626 (which may, for example, at least partially overlap with group 2 DL region 618) to allow group 1 HD mobile stations and/or FD stations to transmit. Mobile stations may transmit in uplink to base station (BS) 104 based on channel resources allocated by BS 104 to a mobile station (reserved resources for UL transmission), which may be granted by BS 104 upon request or on its own, or by a mobile station contending for an uplink channel resource, as examples.

Figure 7:
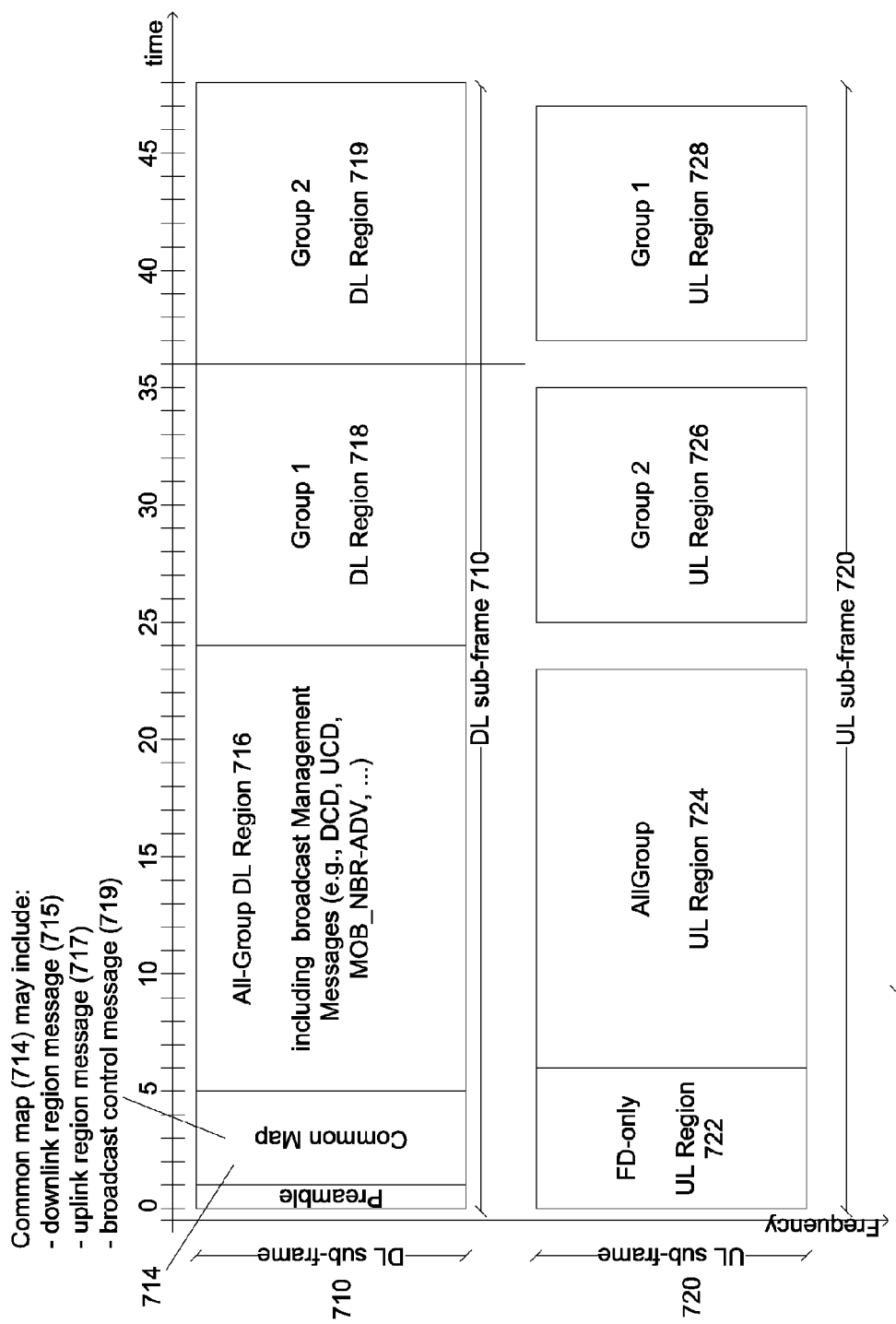
FIG. 7 is a diagram illustrating a frame structure in which management messages are transmitted at or near the beginning of the frame (e.g., following a common map) according to an example embodiment.

FIG. 7 is a diagram illustrating a frame structure in which management messages are transmitted at or near the beginning of the frame (e.g., following a common map) according to an example embodiment. Frame 700 may include a DL subframe 710 and an UL subframe 720. DL subframe may include a preamble, a common map 714, an all-group DL region 716, a group 1 DL region 718, a group 2 DL region 719 and GAPs. The UL subframe 720 may include a FD-only UL region 722, an all-group UL region 724, a group 2 UL region 726, a group 1 UL region 728, and possible GAPs. In this example, as shown in FIG. 7, an all-group DL region 716 may overlap (or occur at about the same time, or at least a portion overlaps) an all-group UL region 724.

In an example embodiment, the all-group DL region 716 in FIG. 7 may include one or more management messages. The management messages, which, in an example embodiment, may be broadcasted to all (e.g., group 1, group 2 and FD) mobile stations in the network, may include any type of management or control messages, such as a DCD (DL channel descriptor) message, a UCD (UL channel descriptor), a paging message, a neighbor advertisement message (e.g., MOB_NBR-ADV), etc. These are just a few example management messages, and any other management or control messages may be transmitted via all-group DL region 716.

Common map 714 may include a downlink region (or zone or group) message 715 and an uplink region (or zone or group) message 717. The DL region message 715 may provide information describing one or more downlink regions, e.g., identifying the group for the region, location (e.g., symbol offset) for the region, and other information. The DL region message 715 and UL region message 717 may describe the structure of the frame, by identifying a group and location for one or more (or even each) region of the frame 700. Similarly, UL region message 717 may provide information describing one or more UL regions, e.g., identifying the group for the region, location (e.g., symbol offset) for the region, and other information. In an example embodiment, a DL region message 715 (or IE) may be provided for each DL region that is included in the current DL subframe, and an UL region message 717 may be provided for each UL region that is included in the current DL subframe. In this manner, the DL region message and UL region message may announce or indicate a structure of the frame, e.g., by specifying the types and locations of one or more regions in the frame.

Table 1 (shown below) illustrates an example DL region message (or DL region information element or IE) 715, and Table 2 (also shown below) illustrates an example UL region message (or IE) 717. The OFDMA (Orthogonal Frequency Division Multiplex Access) offset may identify a starting location for the corresponding region, by identifying a symbol offset (or number of OFDM symbols), where the region starts, as an example of location information. A Group Indication may identify the group for which the region is directed or associated with. Each region may be given one of four labels: group 1, group 2, all-group, and FD-only, based on the Group Indication field. For example, the Group indication for the DL region message 715 may identify the DL message as being either a group 1 DL region (e.g., provided for group 1 HD mobile stations and FD mobile stations), a group 2 DL region (e.g., provided for group 2 HD mobile stations and FD mobile stations), or an all-group DL region (e.g., for all mobile stations, such as for group 1, group 2 and FD mobile stations), for example. Similarly, referring to Table 2, the Group Indication for the UL region message 717 may identify the region as being either a group 1 UL region (e.g., for group 1 and FD mobile stations), a group 2 UL region (e.g., for group 2 and FD mobile stations), an all-group UL region (e.g., for all mobile stations), or an FD-only UL region (only for FD mobile stations).

TABLE 1

Example Downlink Region Message or IE (715)

| Syntax | Size (bits) | Notes |
| --- | --- | --- |
| DL_Region_IE( ) { | | |
| Extended DIUC | 4 | May identify coding rate/modulation scheme for DL region |
| Length | 4 | Length = 0x04 |
| .... | .... | .... |
| OFDMA symbol offset | 7 | Identifies location of DL region |
| H-FDD Group Indication | 2 | 01: Label "Group1" |
| | | 10: Label "Group2" |
| | | 11: Label "AllGroup" |
| | | 00: Label "FD-only" |
| Reserved | 2 | Shall be set to zero |
| } | — | — |

TABLE 2

Example Uplink Region Message or IE (717)

| Syntax | Size (bits) | Notes |
|---|---|---|
| UL_Region_IE( ) { | | |
|   Extended UIUC | 4 | May identify coding rate/ modulation scheme for UL region |
|   Length | 4 | Length = 0x04 |
|   OFDMA symbol offset | 7 | — |
|   .... | ... | ..... |
|   Disable subchannel rotation | 1 | 0 = subchannel rotation enabled<br>1 = subchannel rotation disabled |
|   H-FDD Group Indication | 2 | 01: Label "Group1"<br>10: Label "Group2"<br>11: Label "AllGroup"<br>00: Label "FD-only" |
|   Reserved | 2 | Shall be set to zero |
| } | | |

The common map 714 in FIG. 7 may also include a broadcast control message 719 that may provide information for each of the one or more management messages that may be broadcast within an all-group DL region (e.g., DL region 716) of a frame. Table 3 illustrates an example broadcast control message (or information element or IE) 719. For each management message (e.g., that will transmitted in a next all-group DL region), the message type, the transmission frame (or a frame number or other identifier of a frame that includes a next transmission of the corresponding management message), and a change indication (e.g., an indication as to whether such next transmission of the management message has changes as compared to the current version of that management message). The change indication field may be a bit or flag that may indicate changes or not for the next transmission of the management message. If there are no changes to the message (as indicated by the change indication), then the next transmission of the management message may repeat a current transmission of the management message, for example. For example, in such a case where the next transmission of a management message is a repeated transmission of a management message (e.g., the change indication field=0, indicating no changes for next transmission of that management message), then a mobile station that already has the current information of the management message may not need to receive such a repeated of the management message at that next transmission of the management message.

TABLE 3

Example Broadcast Control Message (IE)

| Syntax | Example Size (bits) | Notes |
|---|---|---|
| Broadcast Control IE { | | |
|   Extended DIUC | 4 | Coding rate/modulation scheme for management message |
|   Length | 4 | — |
|   Number of management messages | 8 | Number of broadcast management messages which will be transmitted in the next all-Group DL region 716 |
|   For (ii = 1: Num messages) { | | For each management message: |
|     Message Type | 8 | e.g., Management Message Type<br>0 = UCD message<br>1 = DCD message<br>2 = paging message<br>3 = x message |

TABLE 3-continued

Example Broadcast Control Message (IE)

| Syntax | Example Size (bits) | Notes |
|---|---|---|
| | | 4 = y message<br>...<br>30 = z message |
|     Transmission Frame | 7 | may indicate a frame number (or other identifier) of a frame that includes the next transmission of the management message |
|     Change indication | 1 | 0: No changes<br>1: Changes |
|   } | | |
|   Padding | variable | — |
| } | | |

As shown in FIG. 7, the all-group UL region 724 overlaps with the all-group DL region 716. According to an example embodiment, the one or more broadcast management message(s) may be transmitted every frame, or alternatively, the all-group DL region 716 (including the one or more broadcasted management messages) may be transmitted less frequently to reduce overhead, such as the BS transmitting the all-group DL region 716 (including broadcast management message) every third frame, or at random frames, or as needed. For example, frame 600 in FIG. 6 is an example frame that may be used/transmitted when the all-group DL region 716 (including broadcast management messages) is not included in a DL subframe. In other words, frame 600 may be used when the base station is not transmitting or broadcasting the management messages to the mobile stations (thus, the frame 600 does not include the all-group DL region), for example. Other example frames, e.g., shown in FIGS. 7-13, may be used when a BS is transmitting the all-group DL region to provide one or more management messages to the mobile stations.

Because of the overlap between the all-group DL region 716 (FIG. 7) and the all-group UL region 724, each HD mobile station may either receive the one or more broadcast management messages (received via the all-group DL region 714), or may transmit UL to the base station (e.g., either via a resource allocated by the BS 104 or by contending for channel access or the transmission resource).

The decision for a HD mobile station to either receive a management message via the all-group DL region 716 or to transmit UL via an overlapping all-group UL region 724, may be either a BS (or network) controlled decision, or a MS controlled decision. For example, in one example embodiment, a MS should (or will) skip the reception of the all-group DL region 716 and perform UL transmission if the MS receives a dedicated UL channel allocation (e.g., assigned to MSs CID or connection ID). This channel allocation may be provided in response to a MS request for UL transmission, or may be provided by the BS without MS request for UL resources.

In an example of an MS controlled decision of whether to perform UL transmission or receive the management message via all-group DL region during the overlap between regions, the mobile station may make this decision, for example, if no UL channel resources have been assigned to the MS for UL transmission during the overlapping region. In such a case, the mobile station may determine whether it needs to receive the management message (e.g., it may decide to receive the management message if either it does not have the current or updated version of the management message, or if a change indicator for the message in the current frame indicates that there will be a change in the management message for the next transmission of the management message). In such case, for example, the mobile station may then choose to receive the next transmission of the management message, rather than performing an UL transmission in the overlapping UL region of that frame.

In an example embodiment, a mobile station may make a decision of whether the mobile station will receive the next transmission of the management message in an all-group downlink region (in a future or subsequent frame) or transmit data via an overlapping uplink region based on a number of factors, such as, for example: whether or not the mobile station has received a resource allocation for an uplink transmission during an uplink region of the future frame (that includes the next transmission) (e.g., a resource allocation granted by the BS to the MS for UL transmission during the UL region may control or require the MS to transmit during the allocated UL resource); whether or not the mobile station has current or updated information associated with the management message (e.g., if MS does not have current or updated management message, then the MS may receive the next transmission of the management message); whether or not the mobile station needs to receive the next transmission of the management message (e.g., MS may receive the next transmission of the management message if the MS has a need for the management message, but does not have the current or updated management message information); and/or whether or not the next transmission of the management message will include any changes (e.g., if the MS needs or is using the management message, the MS may receive the next transmission of the management message where there is an indication that the next transmission will have changes or be updated). These are merely a few examples, and the disclosure is not limited thereto.

As described above, a MS may, at least in some cases, either receive a management message via an all-group DL region 716, or may transmit UL to a BS 104 via an overlapping UL region, such as via all-group UL region 724. In alternative embodiments, a frame may be used in which a group 1 or a group 2 UL region overlaps the all-group DL region 716. In such a case, a group 1 MS or group 2 MS, respectively, may either receive a management message via an all-group DL region or may transmit UL to a BS 104 via an overlapping UL region. Various alternative frames are shown in FIGS. 8-13, in which different regions are located in a different order or at different locations within the frame, and different UL regions (e.g., all-group UL region, group 1 UL region or a group 2 UL region) may overlap the all-group DL region. In these examples, similar to that described above, one or more MSs may (at least in some cases) either receive one or more management messages via an all-group DL region or may transmit UL to a BS 104 via an overlapping UL group region.

Figure 8:
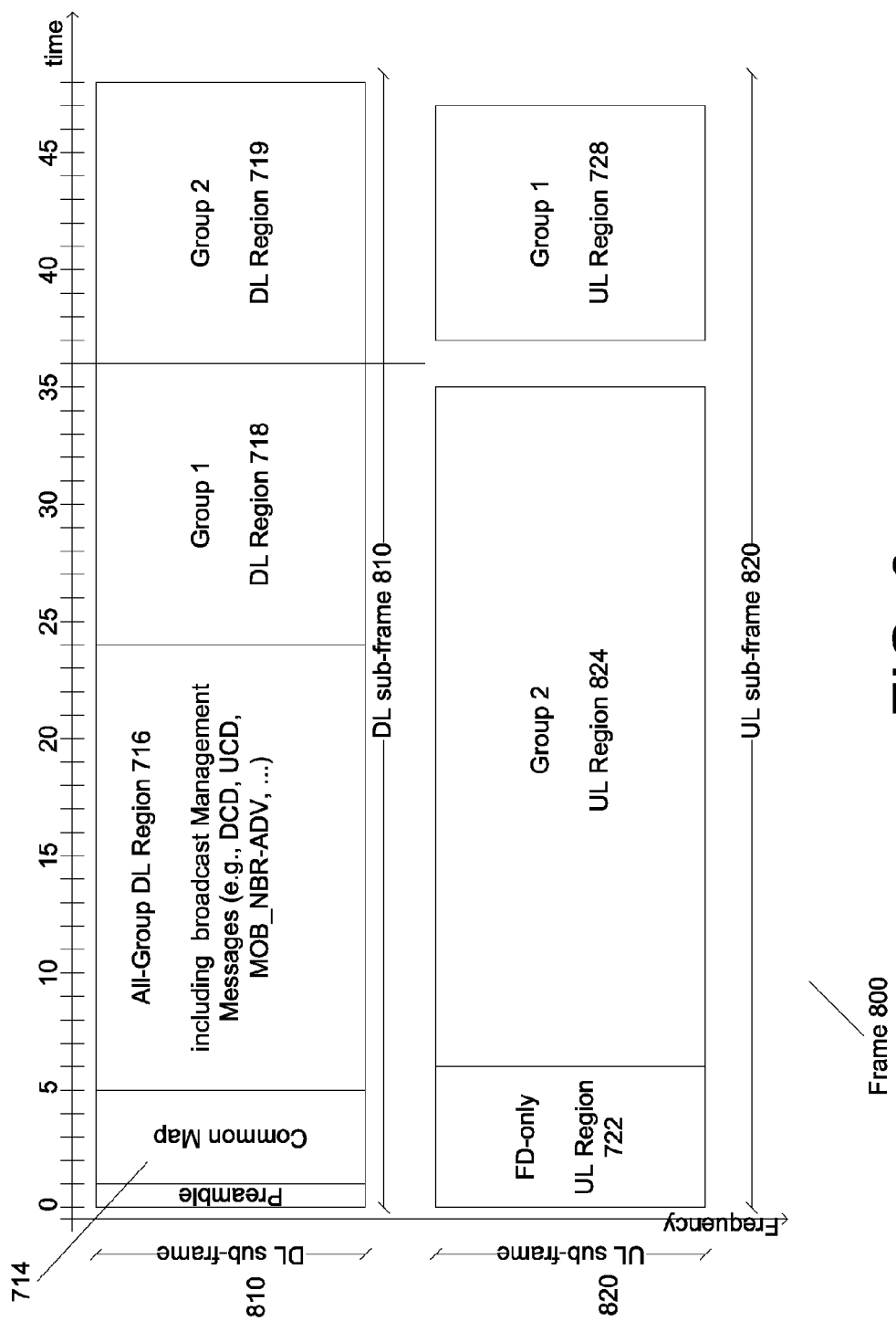
FIG. 8 is a diagram illustrating frame structure in which management messages are transmitted at or near the beginning of the frame and a group 2 UL region is overlapping with an all-group DL region according to an example embodiment.

FIG. 8 is a diagram illustrating frame structure in which management messages are transmitted at or near the beginning of the frame and a group 2 UL region is overlapping with an all-group DL region according to an example embodiment. A frame 800 may include a DL subframe 810 and an UL subframe 820. DL subframe 810 may include a preamble, a common map 714, an all-group DL region 716, a group 1 DL region 718 and a group 2 DL region 719. UL subframe 820 may include a FD-only UL region 722, a group 2 UL region 824 and a group 1 UL region 728. In frame 800, an all-group DL region (including one or more management messages) is transmitted or provided at or near the beginning of the DL subframe 810 (e.g., just after common map 714). Also, in frame 800, the group 2 UL region 824 overlaps with the all-group DL region 716. This frame structure may be useful, for example, in cases where a BS 104 may recognize that no management message updates are necessary for some or all of group 2 mobile stations. In such case, the UL link budget (frame allocation) may be increased for a group 2 user with the extended UL region. For example, this frame structure of frame 800 may be particularly useful where there are management message updates transmitted only to group 1 mobile stations, and the group 2 mobile stations are allowed to make use of group 2 UL region 824 for UL transmissions. This frame structure may, for example, increase a link budget of group 2 MSs that expand or increase the transmission region for the all-group DL region 716.

Figure 9:
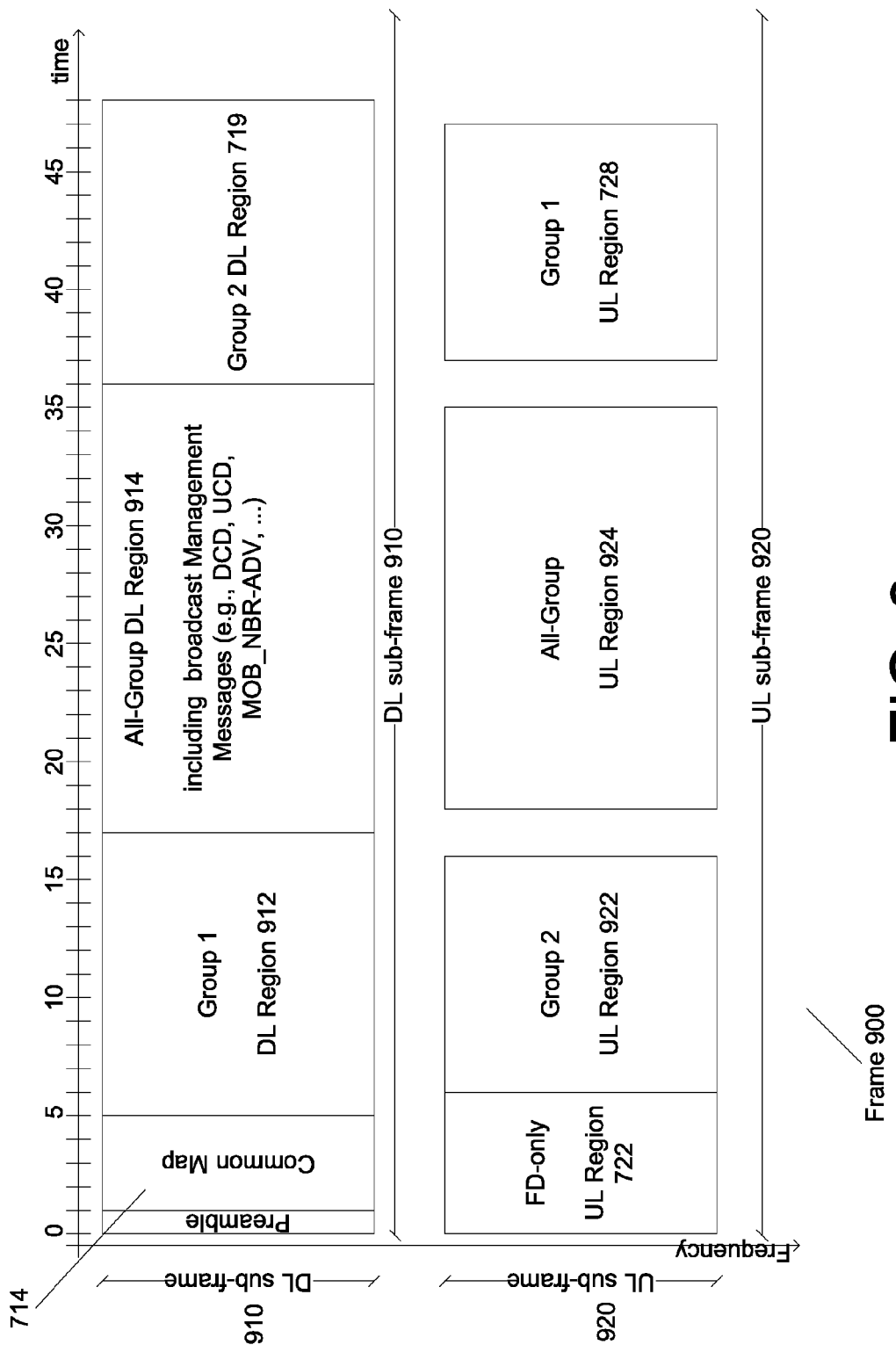
FIG. 9 is a diagram illustrating an example frame structure where all-group DL region and all-group UL region are provided between group regions in the DL subframe and UL subframe, respectively.

FIG. 9 is a diagram illustrating a frame structure where all-group DL region and all-group UL region are provided between group regions in the DL subframe and UL subframe, respectively. A frame 900 may include a DL subframe 910 and an UL subframe 920. DL subframe 910 may include a preamble, a common map 714, a group 1 DL region 912, an all-group DL region 914, and a group 2 DL region 719. UL subframe 920 may include a FD-only UL region 722, a group 2 UL region 922, an all-group UL region 924, and a group 1 UL region 728. Thus, in frame 900, the management messages provided in all-group DL region 914 are transmitted approximately in the middle of the DL subframe (e.g., after group 1 DL region 912 and before group 2 DL region 719).

Figure 10:
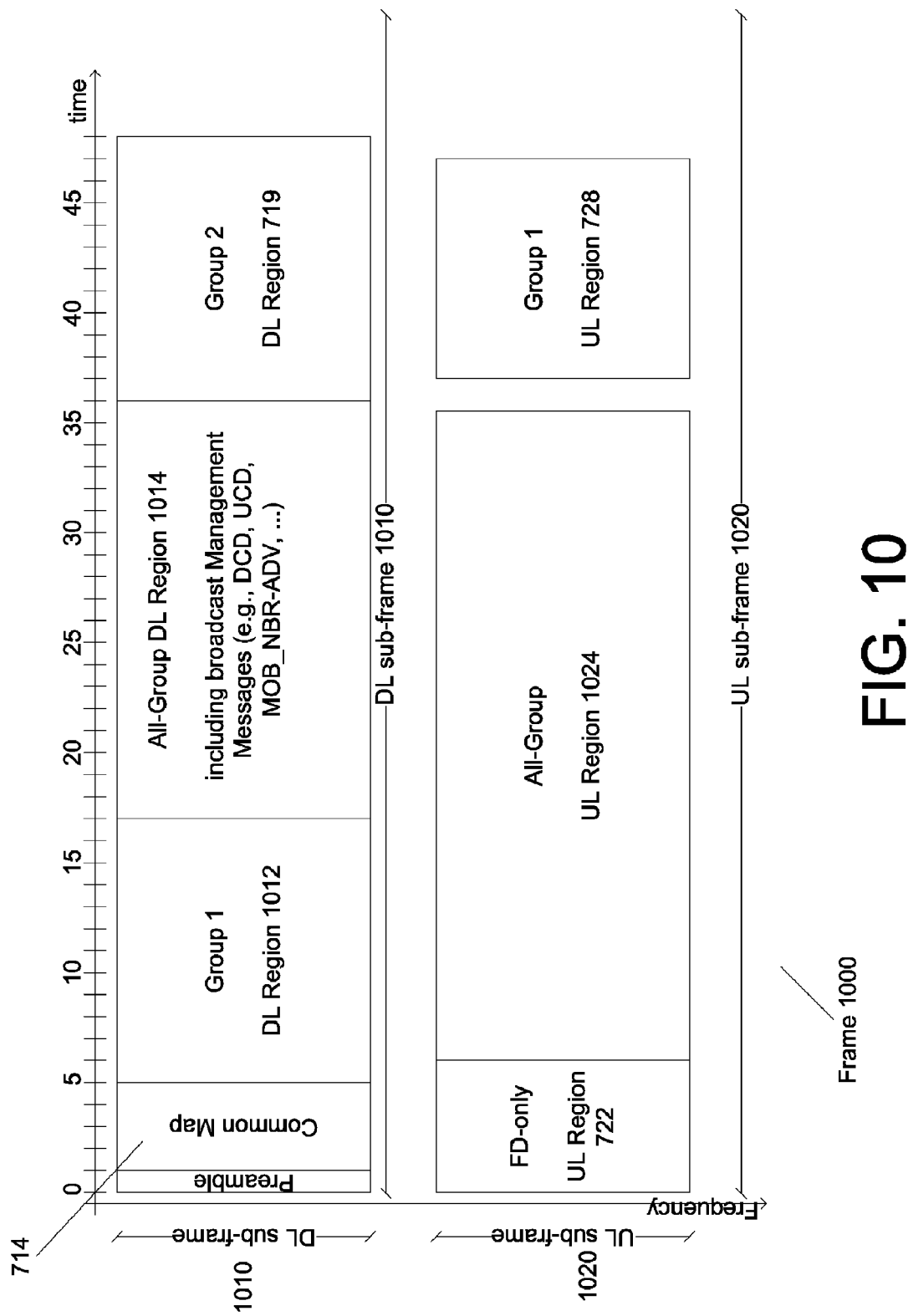
FIG. 10 is a diagram illustrating an example frame structure in which the management messages in the all-group DL region is transmitted between group 1 and group 2 DL regions, and the group 2 UL region overlaps the all-group DL region.

FIG. 10 is a diagram illustrating a frame structure in which the management messages in the all-group DL region is transmitted between group 1 and group 2 DL regions, and the all-group UL region overlaps the all-group DL region. Frame 1000 may include a DL subframe 1010 and an UL subframe 1020. DL subframe 1010 may include a preamble, a common map 714, a group 1 DL region 1012, an all-group DL region 1014, and a group 2 DL region 719. UL subframe 1020 may include a FD-only UL region 722, all-group UL region 1024, and a group 1 UL region 728. This frame structure may be useful, for example, where there are management message updates transmitted via all-group DL region 1014 only to some of group 1 and some of group 2 users, thereby allowing either group 1 MS or group 2 MSs (or both group 1 and group 2 MSs) that do not receive the management messages transmitted via all-group DL region 1014 to perform UL transmission during the overlapping all-group UL region 1024. Alternatively, UL region 1024 may be a group 2 UL region, thereby allowing one or more group 2 MSs to transmit UL, if such group 2 MSs are not receiving DL management messages during an overlapping DL region.

Figure 11:
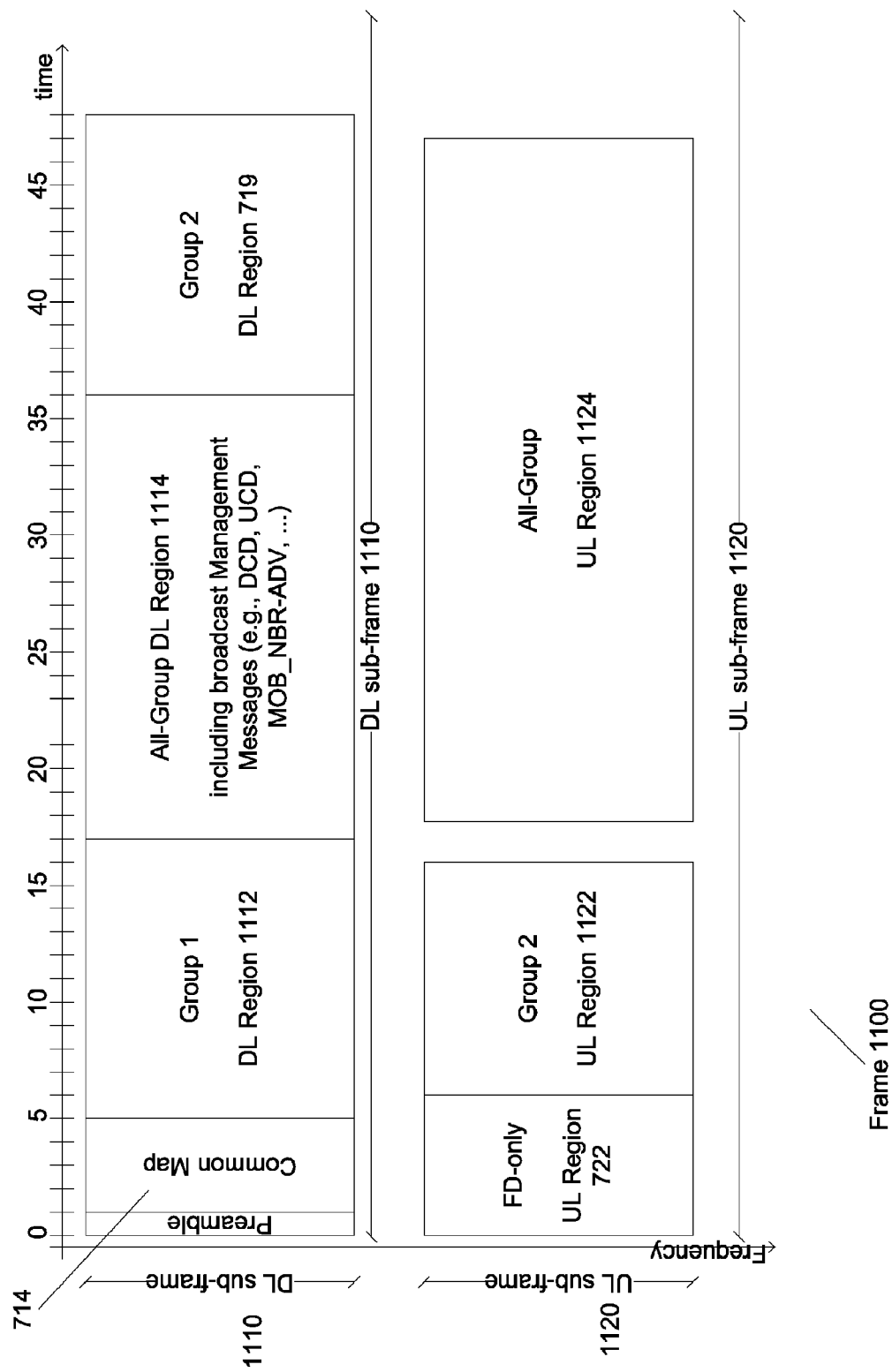
FIG. 11 is a diagram illustrating an example frame structure in which the management messages in the all-group DL region is transmitted between group 1 and group 2 DL regions, and the group 1 UL region overlaps the all-group DL region.

FIG. 11 is a diagram illustrating a frame structure in which the management messages in the all-group DL region is transmitted between group 1 and group 2 DL regions, and the all-group UL region overlaps the all-group DL region. The frame 1100 may include a DL subframe 1110 and an UL subframe 1 120. DL subframe 1110 may include a preamble, a common map 714, a group 1 DL region 1112, an all-group DL region 1114, and a group 2 DL region 719. UL subframe 1120 may include a FD-only UL region 722, a group 2 UL region 1122, and an allgroup UL region 1124. Frame 1100 may be useful, for example, where there are management message updates transmitted via all-group DL region 1114 only to some of group 1 and/or some of group 2 users, thereby allowing group 1 MSs and/or group 2 MSs that do not receive the management messages transmitted via all-group DL region 1124 to perform UL transmission during the overlapping all-group UL region 1124. Alternatively, UL region 1124 may be a group 1 UL region, thereby allowing one or more group 1 MSs to transmit UL, if such group 1 MSs are not receiving DL management messages during an overlapping DL region.

Figure 12:
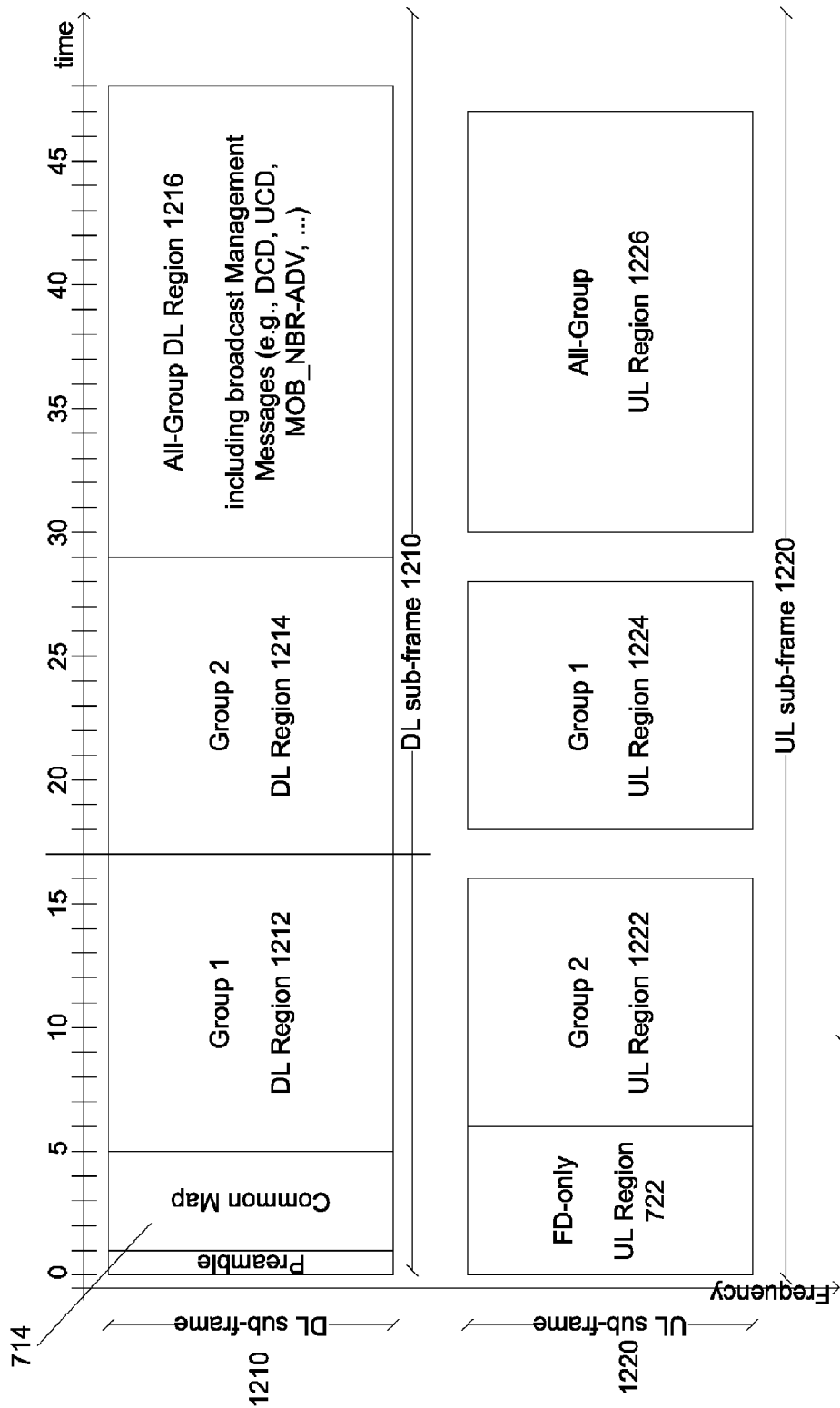
FIG. 12 is a diagram illustrating an example frame structure in which the management messages in the all-group DL region is transmitted after group 1 and group 2 DL regions, and the all-group UL region overlaps the all-group DL region.

FIG. 12 is a diagram illustrating a frame structure in which the management messages in the all-group DL region is transmitted after both group 1 and group 2 DL regions, and the all-group UL region overlaps the all-group DL region. The frame 1200 may include a DL subframe 1210 and an UL subframe 1220. DL subframe 1210 may include a preamble, a common map 714, a group 1 DL region 1212, a group 1 DL region 1214, and an all-group DL region 1216. UL subframe 1220 may include a FD-only UL region 722, a group 2 UL region 1222, and a group 1 UL region 1224, and an all-group UL region 1226. Frame 1200 may be useful, for example, where there are management message updates (changed or updated messages) to be transmitted via all-group DL region 1216 to either group 1 and/or group 2, thereby possibly allowing one or more group 1 MSs or group 2 MSs to perform UL transmission during the overlapping all-group UL region 1226.

Figure 13:
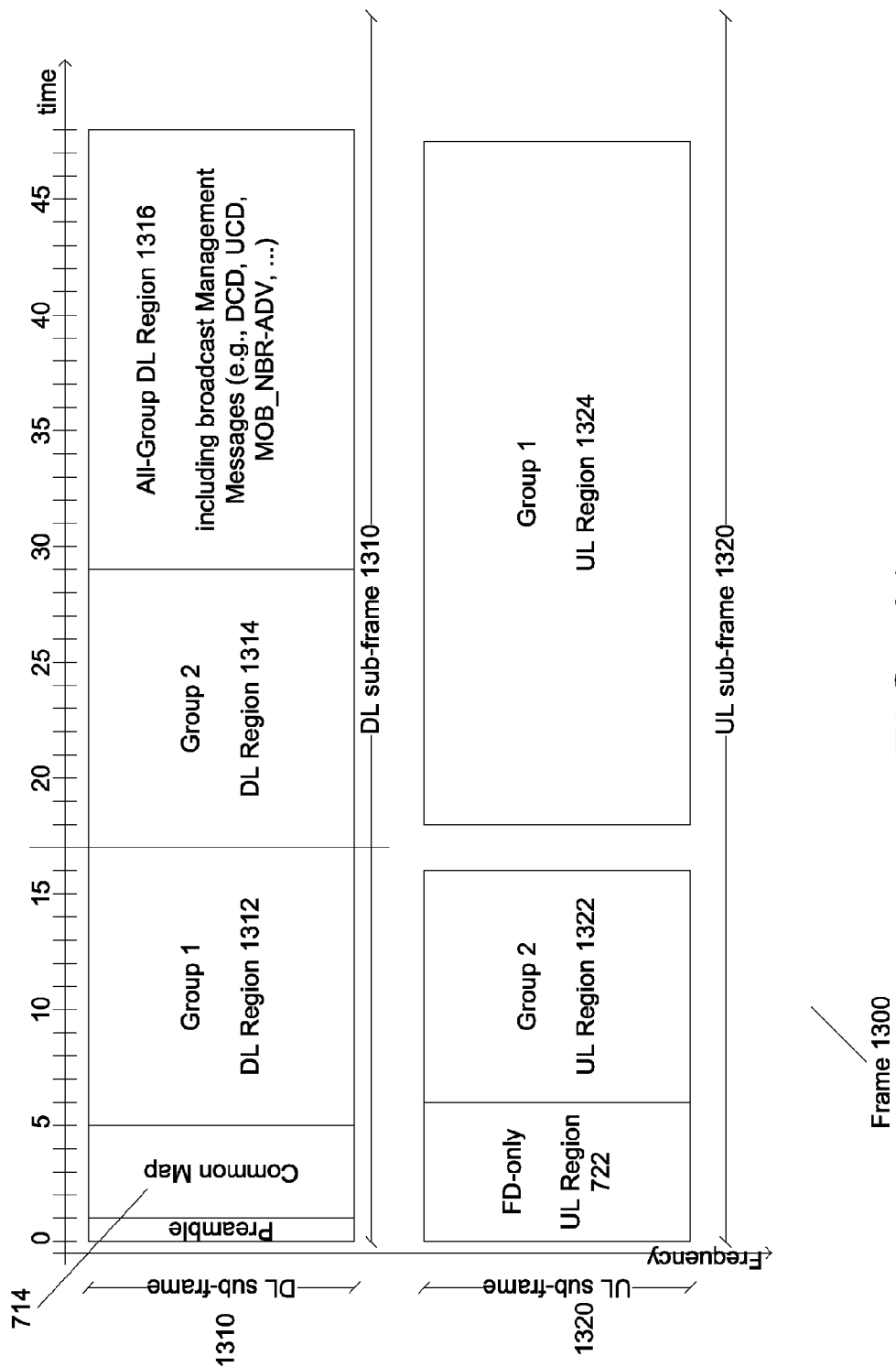
FIG. 13 is a diagram illustrating an example frame structure in which the management messages in the all-group DL region is transmitted after group 1 and group 2 DL regions, and the group 1 UL region overlaps the all-group DL region.

FIG. 13 is a diagram illustrating a frame structure in which the management messages in the all-group DL region is transmitted after both group 1 and group 2 DL regions, and the group 1 UL region overlaps the all-group DL region. The frame 1300 may include a DL subframe 1310 and an UL subframe 1320. DL subframe 1310 may include a preamble, a common map 714, a group 1 DL region 1312, a group 2 DL region 1314, and an all-group DL region 1316. UL subframe 1320 may include a FD-only UL region 722, a group 2 UL region 1322, and a group 1 UL region 1324Frame 1300 may be useful, for example, where there are management message updates to be transmitted via all-group DL region 1316 to group 2, or changes to the management messages only to group 2, thereby allowing group 1 MSs to perform UL transmission during the overlapping all-group 1 UL region 1324. For example, a MS from group 1 may determine that the management messages will not include changes/updates, e.g., based on the change of the indication field in the broadcast control message to determine if a subsequent transmission of a management message includes changes. These are merely examples and the disclosure is not limited thereto.

Figure 14:
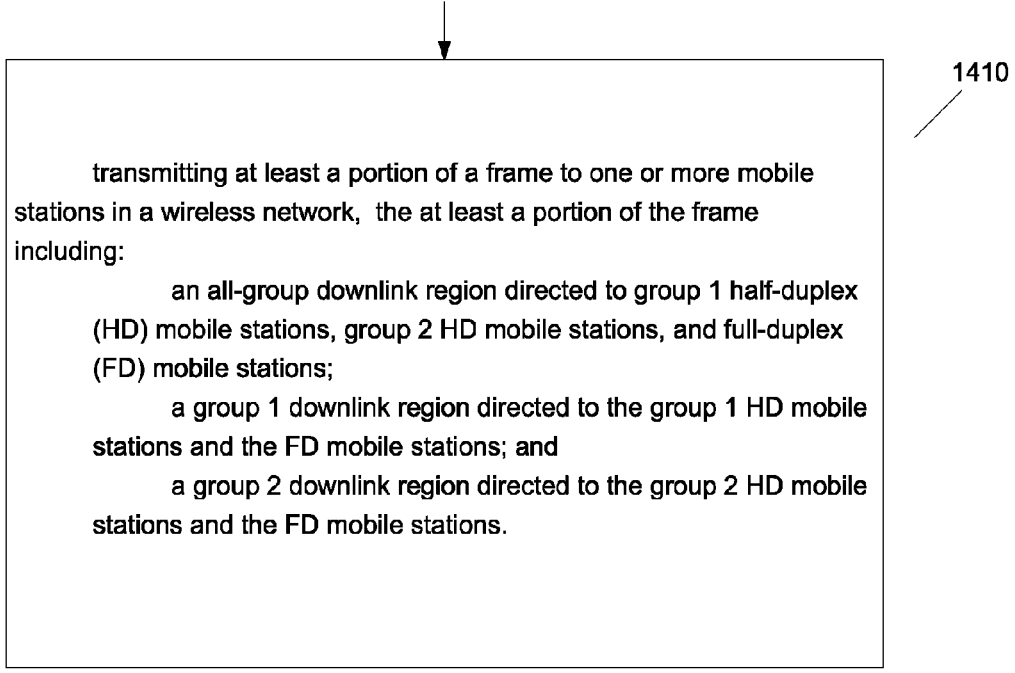
FIG. 14 is a flow chart illustrating operation of a wireless node according to an example embodiment.

FIG. 14 is a flow chart illustrating operation of a wireless node (such as a base station) according to an example embodiment. Operation 1410 may include the wireless node (e.g., base station or other infrastructure node or other node) transmitting at least a portion of a frame to one or more mobile stations in a wireless network, the at least a portion of the frame including: an all-group downlink region directed to group 1 half-duplex (HD) mobile stations, group 2 HD mobile stations, and full-duplex (FD) mobile stations, a group 1 downlink region directed to the group 1 HD mobile stations and the FD mobile stations, and a group 2 downlink region directed to the group 2 HD mobile stations and the FD mobile stations. The at least a portion of the frame may be generated by a controller 1704 at the base station, and then transmitted using a wireless transmitter or wireless transceiver 1702, for example.

In an example embodiment, in the flow chart of FIG. 14, one or more of the mobile stations in the wireless network may be either a group 1 HD mobile station, a group 2 HD mobile station or a FD mobile station.

In an example embodiment, in the flow chart of FIG. 14, the transmitting operation 1410 may include transmitting at least a portion of the frame, the at least a portion of the frame further comprises a preamble and a common map that are directed to the HD mobile stations of both group 1 and the group 2 and the FD mobile stations, at least a portion of the common map may overlap in time with at least a portion of a full duplex (FD)-only uplink region of the frame, the downlink regions being provided on one or more first frequencies and the FD-only uplink region being provided on one or more second frequencies that are different from the one or more first frequencies.

In an example embodiment, in the flow chart of FIG. 14, the transmitting operation 1410 may include transmitting at least a portion of the frame to one or more mobile stations, the frame including the all-group downlink region, the all-group downlink region including one or more management messages broadcast to the HD mobile stations of both group 1 and the group 2 and the FD mobile stations.

In an example embodiment, in the flow chart of FIG. 14, the transmitting operation 1410 may include transmitting at least a portion of the frame to one or more mobile stations, wherein the all-group downlink region is provided in the subframe before both the group 1 downlink region and the group 2 downlink region.

In an example embodiment, in the flow chart of FIG. 14, the transmitting operation 1410 may include transmitting at least a portion of the frame to one or more mobile stations, wherein the all-group downlink region is provided in the subframe between the group 1 downlink region and the group 2 downlink region.

In an example embodiment, in the flow chart of FIG. 14, the transmitting operation 1410 may include transmitting at least a portion of the frame to one or more mobile stations, wherein the all-group downlink region is provided in the subframe after both the group 1 downlink region and the group 2 downlink region.

In an example embodiment, in the flow chart of FIG. 14, the all-group downlink region including one or more management messages broadcast to the HD mobile stations of both group 1 and the group 2 and the FD mobile stations, at least a portion of the all-group downlink region overlapping in time with at least a portion of either a group 1 uplink region or a group 2 uplink region of the frame.

In an example embodiment, in the flow chart of FIG. 14, the at least a portion of the frame further includes a downlink region message that provides information describing one or more of the downlink regions, the downlink region message including the following for one or more of the downlink regions: location information to identify a location within the frame of the downlink region, and a group indication to identify the downlink region as being one of a group 1 downlink region, a group 2 downlink region, or an all-group downlink region.

In an example embodiment, in the flow chart of FIG. 14, the at least a portion of the frame may further include an uplink region message that provides information describing one or more uplink regions of the frame, the uplink region message including the following for one or more of the uplink regions: location information to identify a location within the frame of the uplink region, and a group indication to identify the uplink region as being one of a group 1 uplink region provided for the HD mobile stations of group 1 and full-duplex (FD) mobile stations, a group 2 uplink region provided for the HD mobile stations of group 2 and the FD mobile stations, an FD-only uplink region provided for the FD mobile stations, or an all-group uplink region provided for the HD mobile stations of both group 1 and the group 2 and the FD mobile stations.

In an example embodiment, in the flow chart of FIG. 14, the all-group downlink region may include one or more management messages broadcast to the HD mobile stations of both group 1 and the group 2 and the FD mobile stations, the at least a portion of the frame further includes a broadcast control message that indicates at least the following for one or more management messages: a management message type, a frame number that includes a next transmission of the management messages, and an indication as to whether such next transmission of the management messages will include any changes.

According to an example embodiment, an apparatus may be provided, e.g., for operation at a wireless node. The apparatus may include a controller (e.g., controller 1704) and a wireless transmitter (e.g., which may be included within wireless transceiver 1702) coupled to the controller. The wireless transmitter may be configured to transmit at least a portion of a frame via wireless link to one or more mobile stations in a wireless network, the at least a portion of a frame including: an all-group downlink region directed to group 1 half-duplex (HD) mobile stations, group 2 HD mobile stations, and full-duplex (FD) mobile stations; a group 1 downlink region directed to the group 1 HD mobile stations and the FD mobile stations; and a group 2 downlink region directed to the group 2 HD mobile stations and the FD mobile stations.

In an example embodiment, one or more of the mobile stations in the wireless network are either a group 1 HD mobile station, a group 2 HD mobile station or a FD mobile station.

In another example embodiment, the at least a portion of the frame may further include a preamble and a common map that are directed to the HD mobile stations of both group 1 and the group 2 and the FD mobile stations, at least a portion of the common map overlapping in time with at least a portion of a full duplex (FD)-only uplink region of the frame, the downlink regions being provided on one or more first frequencies and the FD-only uplink region being provided on one or more second frequencies that are different from the one or more first frequencies.

In another example embodiment, the all-group downlink region is provided in the subframe before both the group 1 downlink region and the group 2 downlink region.

In another example embodiment, the all-group downlink region is provided in the subframe between the group 1 downlink region and the group 2 downlink region.

In another example embodiment, the all-group downlink region is provided in the subframe after both the group 1 downlink region and the group 2 downlink region.

In another example embodiment, the all-group downlink region includes one or more management messages broadcast to the HD mobile stations of both group 1 and the group 2 and the FD mobile stations, at least a portion of the all-group downlink region overlapping in time with at least a portion of either a group 1 uplink region or a group 2 uplink region of the frame.

In another example embodiment, the at least a portion of the frame further includes a downlink region message that provides information describing one or more of the downlink regions, the downlink region message including the following for one or more of the downlink regions: location information to identify a location within the frame of the downlink region, and a group indication to identify the downlink region as being one of a group 1 downlink region, a group 2 downlink region, or an all-group downlink region.

In another example embodiment, the at least a portion of the frame further includes an uplink region message that provides information describing one or more uplink regions of the frame, the uplink region message including the following for one or more of the uplink regions: location information to identify a location within the frame of the uplink region, and a group indication to identify the uplink region as being one of a group 1 uplink region provided for the HD mobile stations of group 1 and full-duplex (FD) mobile stations, a group 2 uplink region provided for the HD mobile stations of group 2 and the FD mobile stations, an FD-only uplink region provided for the FD mobile stations, or an all-group uplink region provided for the HD mobile stations of both group 1 and the group 2 and the FD mobile stations.

In another example embodiment, the all-group downlink region includes one or more management messages broadcast to the HD mobile stations of both group 1 and the group 2 and the FD mobile stations, the at least a portion of the frame further includes a broadcast control message that indicates at least the following for one or more management messages: a management message type, a frame number that includes a next transmission of the management message, and an indication as to whether such next transmission of the management message will include any changes.

Figure 15:
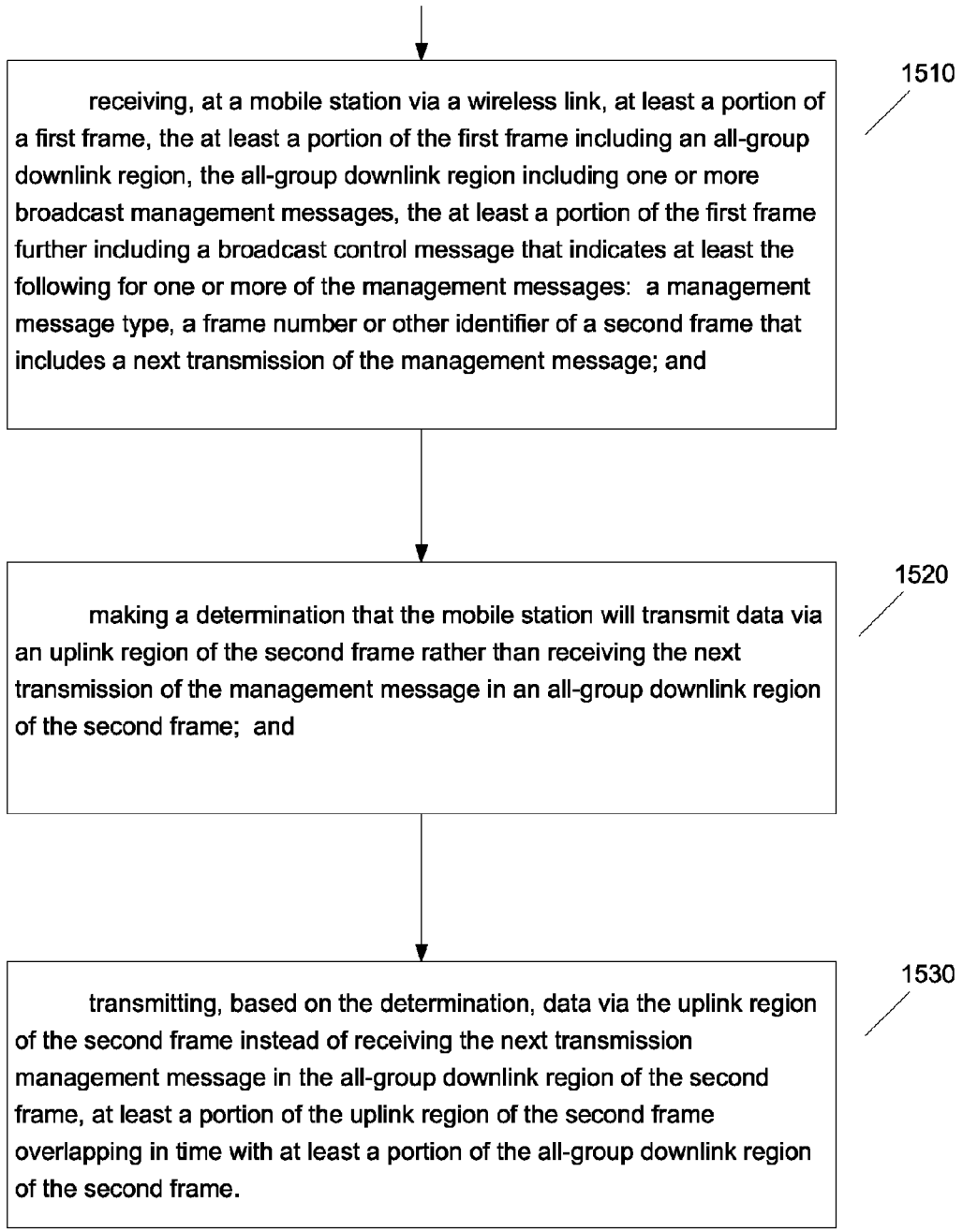
FIG. 15 is a flow chart illustrating operation of a wireless node according to another example embodiment.

FIG. 15 is a flow chart illustrating operation of a wireless node (e.g., mobile station) according to an example embodiment. The method may include receiving (1510), at a mobile station via a wireless link, at least a portion of a first frame, the at least a portion of the first frame including an all-group downlink region, the all-group downlink region including one or more broadcast management messages, the at least a portion of the first frame further including a broadcast control message that indicates at least the following for one or more of the management messages: a management message type, a frame number or other identifier of a second frame that includes a next transmission of the management message.

The flow chart of FIG. 15 may also include making (1520) a determination that the mobile station will transmit data via an uplink region of the second frame rather than receiving the next transmission of the management message in an all-group downlink region of the second frame, and transmitting (1530), based on the determination, data via the uplink region of the second frame instead of receiving the next transmission management message in the all-group downlink region of the second frame, at least a portion of the uplink region of the second frame overlapping in time with at least a portion of the all-group downlink region of the second frame. (Alternatively, the MS may make a determination or decision to receive the next transmission of the management message in an all-group downlink region of the second frame.)

In an example embodiment, the making (1520) a determination may include the mobile station determining that the mobile station will transmit data via the uplink region of the second frame rather than receiving the next transmission of the management message in the all-group region of the second frame if a base station transmitting the first and second frames has allocated resources to the mobile station for uplink transmission during the uplink region of the second frame.

In an example embodiment, the making (1520) a determination may include the mobile station determining that the mobile station will transmit data via the uplink region of the second frame rather than receiving the next transmission of the management message in the all-group region of the second frame based on determining at least one of the following: a base station transmitting the first and second frames has allocated resources to the mobile station for uplink transmission during the uplink region of the second frame; or the mobile station does not need to receive the management message and will contend for resources to transmit during the uplink region of the second frame.

In another example embodiment of the flow chart of FIG. 15, the all-group downlink region may be directed to group 1 half-duplex (HD) mobile stations, group 2 HD mobile stations, and full-duplex (FD) mobile stations.

In another example embodiment, the broadcast control message may indicate at least the following for one or more of the management messages: a management message type, a frame number or other identifier of a second frame that includes a next transmission of the management message, and an indication as to whether such next transmission of the management message will include any changes.

In another example embodiment, the all-group downlink region is directed to group 1 half-duplex (HD) mobile stations, group 2 HD mobile stations, and full-duplex (FD) mobile stations, and further wherein the first frame and the second frame each also include a group 1 downlink region directed to group 1 HD mobile stations and FD mobile stations, and a group 2 downlink region directed to the group 2 HD mobile stations and the FD mobile stations, wherein the all-group downlink region is provided before both the group 1 downlink region and the group 2 downlink region.

In another example embodiment, the all-group downlink region is directed to group 1 half-duplex (HD) mobile stations, group 2 HD mobile stations, and full-duplex (FD) mobile stations, wherein at least a portion of the all-group downlink region is overlapping in time with at least a portion of either a group 1 uplink region or a group 2 uplink region of the frame.

According to another example embodiment, an apparatus is provided. The apparatus may include a receiver (e.g., a receiver included within wireless transceiver 1702) at a mobile station, the receiver configured to receive via a wireless link, at least a portion of a first frame, the at least a portion of the first frame including an all-group downlink region, the all-group downlink region including one or more broadcast management messages, the at least a portion of the first frame further including a broadcast control message that indicates at least the following for one or more of the management messages: a management message type, a frame number or other identifier of a second frame that includes a next transmission of the management message. The apparatus may also include a controller (e.g., controller 1704) configured to make a determination that the mobile station will transmit data via an uplink region of the second frame rather than receiving the next transmission of the management message in an all-group downlink region of the second frame, and a transmitter (e.g., a transmitter as part of wireless transceiver 1702) configured to transmit, based on the determination, data via the uplink region of the second frame instead of receiving the management message in the all-group downlink region of the second frame, at least a portion of the uplink region of the second frame overlapping in time with at least a portion of the all-group downlink region of the second frame.

Figure 16:
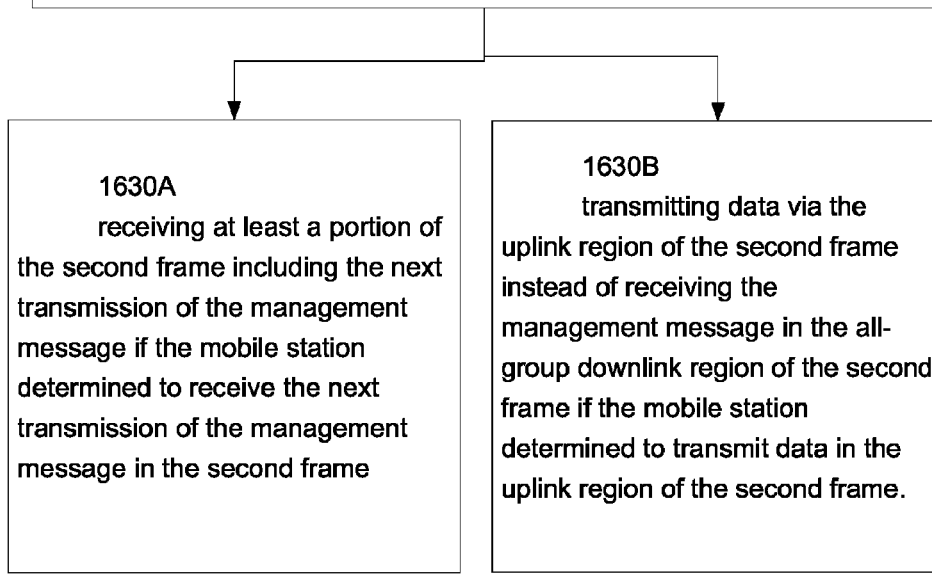
FIG. 16 is a flow chart illustrating operation of a wireless node according to yet another example embodiment.

FIG. 16 is a flow chart illustrating operation of a wireless node (e.g., a mobile station) according to an example embodiment. The flow chart of FIG. 16 may include receiving (1610), at a mobile station via a wireless link, at least a portion of a first frame, the at least a portion of the first frame including an all-group downlink region directed to group 1 half-duplex (HD) mobile stations, group 2 HD mobile stations, and full-duplex (FD) mobile stations, the all-group downlink region including a broadcast management message, the at least a portion of the first frame further including a broadcast control message that indicates at least the following for the management message: a management message type, a frame number or other identifier of a second frame that includes a next transmission of the management message, and an indication as to whether such next transmission of the management message will include any changes. The flow chart of FIG. 16 may also include determining (1620) whether the mobile station will receive the next transmission of the management message in an all-group downlink region of the second frame or transmit data via an uplink region of the second frame, at least a portion of the uplink region of the second frame overlapping at least a portion of the all-group downlink region of the second frame.

The flow chart of FIG. 16 may also include either receiving (1630A) at least a portion of the second frame including the next transmission of the management message if the mobile station determined to receive the next transmission of the management message in the second frame, or transmitting (1630B) data via the uplink region of the second frame instead of receiving the management message in the all-group downlink region of the second frame if the mobile station determined to transmit data in the uplink region of the second frame.

In the flow chart of FIG. 16, the determining (1620) may be performed based on one or more of the following: whether or not the mobile station has received a resource allocation for an uplink transmission during an uplink region of the second frame; whether or not the mobile station has current or updated information associated with the management message; whether or not the mobile station needs to receive the next transmission of the management message; or whether or not the next transmission of the management message will include any changes.

In the flow chart of FIG. 16, the determining (1620) may include determining that the mobile station will receive the next transmission of the management message in the second frame based on one or more of: determining that resources have not been allocated to the mobile station for uplink transmission during the uplink region of the second frame; or determining that the management message will change during the next transmission of the management message in the second frame, based on the indication in the first frame as to whether such next transmission of the management message will include any changes.

According to another example embodiment, an apparatus may include a receiver (e.g., a receiver included within wireless transceiver 1702) at a mobile station. The receiver may be configured to receive via a wireless link, at least a portion of a first frame, the at least a portion of the first frame including an all-group downlink region directed to group 1 half-duplex (HD) mobile stations, group 2 HD mobile stations, and full-duplex (FD) mobile stations, the all-group downlink region including a broadcast management message, the at least a portion of the first frame further including a broadcast control message that indicates at least the following for the management message: a management message type, a frame number or other identifier of a second frame that includes a next transmission of the management message, and an indication as to whether such next transmission of the management message will include any changes. The apparatus may include a controller (e.g., controller 1704) configured to determine whether the mobile station will receive the next transmission of the management message in an all-group downlink region of the second frame or transmit data via an uplink region of the second frame, at least a portion of the uplink region of the second frame overlapping at least a portion of the all-group downlink region of the second frame. In addition, the receiver may be configured to receive at least a portion of the second frame including the next transmission of the management message if the mobile station determined to receive the next transmission of the management message in the second frame. The apparatus may also include a transmitter configured to transmit data via the uplink region of the second frame instead of receiving the management message in the all-group downlink region of the second frame if the mobile station determined to transmit data in the uplink region of the second frame.

In an example embodiment, the mobile station may be either a group 1 HD mobile station or a group 2 HD mobile station, the downlink regions of each of the frames being provided via one or more first frequencies, and the uplink regions of each of the uplink regions of each of the frames being provided via one or more second frequencies that are different than the one or more first frequencies to provide frequency division duplexing between uplink and downlink transmissions.

Figure 17:
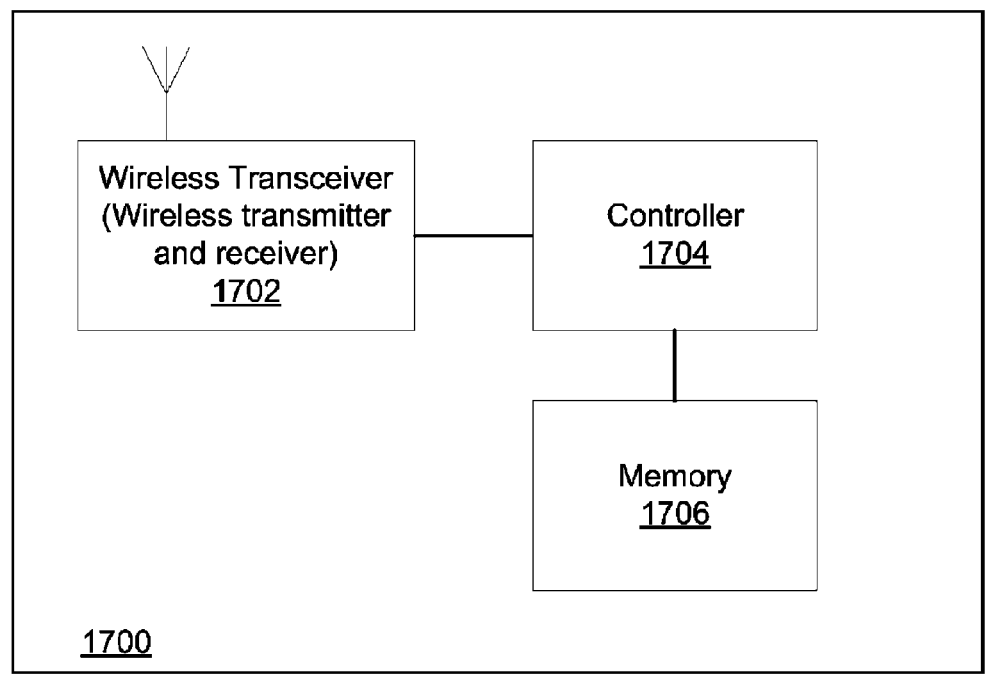
FIG. 17 is a block diagram of a wireless node according to an example embodiment.

FIG. 17 is a block diagram of a wireless station (or wireless node) 1700 according to an example embodiment. The wireless station 1700 (e.g. base station 104 or mobile node 106, 108, 110) may include, for example, a wireless transceiver (or wireless interface) 1702, including a transmitter to transmit signals and a receiver to receive signals, a controller 1704 to control operation of the station and execute instructions or software, and a memory 1706 to store data and/or instructions. Controller 1704 may also make decisions or determinations, generate frames or messages for transmission, decode received frames or messages for further processing, and other tasks or functions described herein.

Controller 1704 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1704, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    transmitting at least a portion of a frame to one or more mobile stations in a wireless network, the at least a portion of the frame including a downlink subframe that includes:
    an all-group downlink region directed to group 1 half-duplex (HD) mobile stations, group 2 HD mobile stations, and full-duplex (FD) mobile stations;
    a group 1 downlink region directed to the group 1 HD mobile stations and the FD mobile stations; and
    a group 2 downlink region directed to the group 2 HD mobile stations and the FD mobile stations; and
        wherein the frame also includes a full-duplex (FD)-only uplink region that overlaps a portion of the downlink subframe of the frame.

2. The method of claim 1 wherein one or more of the mobile stations in the wireless network are either a group 1 HD mobile station, a group 2 HD mobile station or a FD mobile station.

3. The method of claim 1 wherein the transmitting comprises transmitting at least a portion of the frame, the downlink subframe further includes a preamble and a common map that are directed to the HD mobile stations of both group 1 and the group 2 and the FD mobile stations, at least a portion of the common map overlapping in time with at least a portion of the full duplex (FD)-only uplink region of the frame, the downlink regions being provided on one or more first frequencies and the FD-only uplink region being provided on one or more second frequencies that are different from the one or more first frequencies.

4. The method of claim 1 wherein the transmitting comprises transmitting at least a portion of the frame to one or more mobile stations, the frame including the all-group downlink region, the all-group downlink region including one or more management messages broadcast to the HD mobile stations of both group 1 and the group 2 and the FD mobile stations.

5. The method of claim 1 wherein the transmitting comprises transmitting at least a portion of the frame to one or more mobile stations, wherein the all-group downlink region is provided in the subframe before both the group 1 downlink region and the group 2 downlink region.

6. The method of claim 1 wherein the transmitting comprises transmitting at least a portion of the frame to one or more mobile stations, wherein the all-group downlink region is provided in the subframe between the group 1 downlink region and the group 2 downlink region.

7. The method of claim 1 wherein the transmitting comprises transmitting at least a portion of the frame to one or more mobile stations, wherein the all-group downlink region is provided in the subframe after both the group 1 downlink region and the group 2 downlink region.

8. The method of claim 1 wherein the all-group downlink region including one or more management messages broadcast to the HD mobile stations of both group 1 and the group 2 and the FD mobile stations, at least a portion of the all-group downlink region overlapping in time with at least a portion of an all-group uplink region of the frame.

9. The method of claim 1 wherein the at least a portion of the frame further includes a downlink region message that provides information describing one or more of the downlink regions, the downlink region message including the following for one or more of the downlink regions: location information to identify a location within the frame of the downlink region, and a group indication to identify the downlink region as being one of a group 1 downlink region, a group 2 downlink region, or an all-group downlink region.

10. The method of claim 1 wherein the at least a portion of the frame further includes an uplink region message that provides information describing one or more uplink regions of the frame, the uplink region message including the following for one or more of the uplink regions: location information to identify a location within the frame of the uplink region, and a group indication to identify the uplink region as being one of a group 1 uplink region provided for the HD mobile stations of group 1 and full-duplex (FD) mobile stations, a group 2 uplink region provided for the HD mobile stations of group 2 and the FD mobile stations, an FD-only uplink region provided for the FD mobile stations, or an all-group uplink region provided for the HD mobile stations of both group 1 and the group 2 and the FD mobile stations.

11. The method of claim 1 wherein the all-group downlink region includes one or more management messages broadcast to the HD mobile stations of both group 1 and the group 2 and the FD mobile stations, the at least a portion of the frame further includes a broadcast control message that indicates at least the following for one or more management messages: a management message type, a frame number that includes a next transmission of the management message, and an indication as to whether such next transmission of the management message will include any changes.

12. An apparatus comprising:
a controller; and
a wireless transmitter coupled to the controller, the wireless transmitter configured to transmit at least a portion of a frame via wireless link to one or more mobile stations in a wireless network, the at least a portion of a frame including a downlink subframe that includes:
an all-group downlink region directed to group 1 half-duplex (HD) mobile stations, group 2 HD mobile stations, and full-duplex (FD) mobile stations;
a group 1 downlink region directed to the group 1 HD mobile stations and the FD mobile stations; and
a group 2 downlink region directed to the group 2 HD mobile stations and the FD mobile stations; and
wherein the frame also includes a full-duplex (FD)-only uplink region that overlaps a portion of the downlink subframe of the frame.

13. The apparatus of claim 12 wherein one or more of the mobile stations in the wireless network are either a group 1 HD mobile station, a group 2 HD mobile station or a FD mobile station.

14. The apparatus of claim 12 wherein the downlink subframe further includes a preamble and a common map that are directed to the HD mobile stations of both group 1 and the group 2 and the FD mobile stations, at least a portion of the common map overlapping in time with at least a portion of the full duplex (FD)-only uplink region of the frame, the downlink regions being provided on one or more first frequencies and the FD-only uplink region being provided on one or more second frequencies that are different from the one or more first frequencies.

15. The apparatus of claim 12 wherein the all-group downlink region is provided in the subframe before both the group 1 downlink region and the group 2 downlink region.

16. The apparatus of claim 12 wherein the all-group downlink region is provided in the subframe between the group 1 downlink region and the group 2 downlink region.

17. The apparatus of claim 12 wherein the all-group downlink region is provided in the subframe after both the group 1 downlink region and the group 2 downlink region.

18. The apparatus of claim 12 wherein the all-group downlink region includes one or more management messages broadcast to the HD mobile stations of both group 1 and the group 2 and the FD mobile stations, at least a portion of the all-group downlink region overlapping in time with at least a portion of either a group 1 uplink region or a group 2 uplink region of the frame.

19. The apparatus of claim 12 wherein the at least a portion of the frame further includes a downlink region message that provides information describing one or more of the downlink regions, the downlink region message including the following for one or more of the downlink regions: location information to identify a location within the frame of the downlink region, and a group indication to identify the downlink region as being one of a group 1 downlink region, a group 2 downlink region, or an all-group downlink region.

20. The apparatus of claim 12 wherein the at least a portion of the frame further includes an uplink region message that provides information describing one or more uplink regions of the frame, the uplink region message including the following for one or more of the uplink regions: location information to identify a location within the frame of the uplink region, and a group indication to identify the uplink region as being one of a group 1 uplink region provided for the HD mobile stations of group 1 and full-duplex (FD) mobile stations, a group 2 uplink region provided for the HD mobile stations of group 2 and the FD mobile stations, an FD-only uplink region provided for the FD mobile stations, or an all-group uplink region provided for the HD mobile stations of both group 1 and the group 2 and the FD mobile stations.

21. The apparatus of claim 12 wherein the all-group downlink region includes one or more management messages broadcast to the HD mobile stations of both group 1 and the group 2 and the FD mobile stations, the at least a portion of the frame further includes a broadcast control message that indicates at least the following for one or more management messages: a management message type, a frame number that includes a next transmission of the management message, and an indication as to whether such next transmission of the management message will include any changes.

22. A method comprising:
receiving, by a mobile station in a frequency division duplex wireless network, at least a portion of a downlink subframe of a first frame that includes a change indication that indicates whether a next version of a management message will have changes as compared to a current version of the management message;
receiving the next version of the management message via an all-group downlink region of a second frame if the change indication indicates that the next version of the management message will have changes;
transmitting data via an all-group uplink region of the second frame that at least partially overlaps with the all-group downlink region of the second frame if the change indication indicates no changes for the next version of the management message;
wherein the downlink subframe of the first frame or second frame includes:
a group 1 downlink region directed to group 1 half-duplex (HD) mobile stations and full-duplex (FD) mobile stations; and
a group 2 downlink region directed to group 2 HD mobile stations and the FD mobile stations; and
wherein the first frame or second frame also includes a full-duplex (FD)-only uplink region that overlaps a portion of the downlink subframe of the frame.

23. The method of claim 22 wherein the change indication is received by the mobile station as part of a broadcast control message that is received via an all-group downlink region of the first frame.

24. The method of claim 22 wherein the transmitting data via an all-group uplink region of the second frame comprises:
determining whether the mobile station has received a resource allocation for an uplink transmission during the all-group uplink region of the second frame; and
transmitting data via the all-group uplink region of the second frame that at least partially overlaps with the all-group downlink region of the second frame if the change indication indicates no changes for the next version of the management message and the mobile station has received a resource allocation for an uplink transmission.

25. An apparatus comprising:
at least one processor; and
at least one memory including computer program code, the at least one memory and the computer program code configured to, with the at least one processor cause the apparatus to at least:
receive, by a mobile station in a frequency division duplex wireless network, at least a portion of a downlink subframe of a first frame that includes a change indication that indicates whether a next version of a management message will have changes as compared to a current version of the management message;
receive the next version of the management message via an all-group downlink region of a second frame if the change indication indicates that the next version of the management message will have changes;
transmit data via an all-group uplink region of the second frame that at least partially overlaps with the all-group downlink region of the second frame if the change indication indicates no changes for the next version of the management message;
wherein the downlink subframe of the first frame or second frame includes:
a group 1 downlink region directed to group 1 half-duplex (HD) mobile stations and full-duplex (FD) mobile stations; and
a group 2 downlink region directed to group 2 HD mobile stations and the FD mobile stations; and
wherein the first frame or second frame also includes a full-duplex (FD)-only uplink region that overlaps a portion of the downlink subframe of the frame.

26. A method comprising:
determining, by a mobile station in a frequency division duplex wireless network, whether the mobile station has received a resource allocation for an uplink transmission during an all-group uplink region of a frame;
receiving information via a downlink region of the frame that at least partially overlaps the all-group uplink region of the frame if the mobile station has not received a resource allocation for an uplink transmission during the all-group uplink region of the frame;
transmitting data via the all-group uplink region of the frame if the mobile station has received a resource allocation for an uplink transmission during the all-group uplink region of the frame;
wherein a downlink subframe of the frame includes:
a group 1 downlink region directed to group 1 half-duplex (HD) mobile stations and full-duplex (FD) mobile stations; and
a group 2 downlink region directed to group 2 HD mobile stations and the FD mobile stations; and
wherein the frame also includes a full-duplex (FD)-only uplink region that overlaps a portion of the downlink subframe of the frame.

27. The method of claim 26 wherein the receiving comprises:
receiving a change indication that indicates whether a next version of a management message will have changes as compared to a current version of the management message; and
receiving information, including the next version of the management message, via a downlink region of the frame if the mobile station has not received a resource allocation for an uplink transmission via the all-group uplink region and if the change indication indicates no changes for the next version of the management message.

28. The method of claim 26 wherein the downlink region of the frame comprises an all-group downlink region of the frame that at least partially overlaps the all-group uplink region of the frame.

29. The method of claim 26 wherein the receiving comprises receiving information, including a management message, via a downlink region of the frame.

30. An apparatus comprising:
at least one processor; and at least one memory including computer program code, the at least one memory and the computer program code configured to, with the at least one processor cause the apparatus to at least:

determine, by a mobile station in a frequency division duplex wireless network, whether the mobile station has received a resource allocation for an uplink transmission during an all-group uplink region of a frame;

receive information via a downlink region of the frame that at least partially overlaps the all-group uplink region of the frame if the mobile station has not received a resource allocation for an uplink transmission during the all-group uplink region of the frame;

transmit data via the all-group uplink region of the frame if the mobile station has received a resource allocation for an uplink transmission during the all-group uplink region of the frame;

wherein a downlink subframe of the frame includes:
 a group 1 downlink region directed to group 1 half-duplex (HD) mobile stations and full-duplex (FD) mobile stations; and
 a group 2 downlink region directed to group 2 HD mobile stations and the FD mobile stations; and wherein the frame also includes a full-duplex (FD)-only uplink region that overlaps a portion of the downlink subframe of the frame.

* * * * *